United States Patent
Kitayama et al.

(10) Patent No.: US 10,597,525 B2
(45) Date of Patent: Mar. 24, 2020

(54) RESIN COMPOSITION AND FILM THEREOF

(71) Applicant: KANEKA CORPORATION, Osaka-shi, Osaka (JP)

(72) Inventors: Fuminobu Kitayama, Hyogo (JP); Nobuyoshi Maizuru, Hyogo (JP); Keisuke Hatano, Osaka (JP)

(73) Assignee: KANEKA CORPORATION, Osaka (JP)

( * ) Notice: Subject to any disclaimer, the term of this patent is extended or adjusted under 35 U.S.C. 154(b) by 402 days.

(21) Appl. No.: 14/782,222

(22) PCT Filed: Jun. 26, 2013

(86) PCT No.: PCT/JP2013/003993
§ 371 (c)(1),
(2) Date: Oct. 2, 2015

(87) PCT Pub. No.: WO2014/162369
PCT Pub. Date: Oct. 9, 2014

(65) Prior Publication Data
US 2016/0053104 A1    Feb. 25, 2016

(30) Foreign Application Priority Data
Apr. 5, 2013   (JP) ................. 2013-080009

(51) Int. Cl.
| | | |
|---|---|---|
| C08L 33/12 | (2006.01) | |
| C08F 265/06 | (2006.01) | |
| C08L 51/04 | (2006.01) | |
| C08L 51/06 | (2006.01) | |
| G02B 1/04 | (2006.01) | |
| C08J 5/18 | (2006.01) | |
| C08L 33/08 | (2006.01) | |

(52) U.S. Cl.
CPC ............ *C08L 33/12* (2013.01); *C08F 265/06* (2013.01); *C08J 5/18* (2013.01); *C08L 33/08* (2013.01); *C08L 51/04* (2013.01); *C08L 51/06* (2013.01); *G02B 1/04* (2013.01); *C08J 2333/08* (2013.01); *C08J 2333/12* (2013.01); *C08J 2433/08* (2013.01); *C08J 2433/12* (2013.01); *C08L 2203/16* (2013.01); *C08L 2205/025* (2013.01); *C08L 2205/035* (2013.01)

(58) Field of Classification Search
CPC .......... C08L 33/12; C08L 51/04; C08L 51/06; C08L 33/08; C08F 265/06
See application file for complete search history.

(56) References Cited

U.S. PATENT DOCUMENTS

| | | | |
|---|---|---|---|
| 4,373,065 A | 2/1983 | Prest, Jr. | |
| 6,348,542 B1 * | 2/2002 | Naruse | C08F 285/00 524/504 |
| 2007/0243364 A1 * | 10/2007 | Maekawa | C08L 33/064 428/220 |
| 2008/0318072 A1 | 12/2008 | Kawabata et al. | |
| 2009/0306321 A1 | 12/2009 | Koike | |
| 2013/0072651 A1 | 3/2013 | Yonemura et al. | |

FOREIGN PATENT DOCUMENTS

| | | |
|---|---|---|
| CN | 1902240 | 1/2007 |
| CN | 1946794 | 4/2007 |
| CN | 101040195 | 9/2007 |
| EP | 2865716 | 4/2015 |
| JP | 6-057157 | 1/1994 |
| JP | 11-293116 | 10/1999 |
| JP | 3648201 | 5/2005 |
| JP | 3696649 | 9/2005 |
| JP | 2006-308682 | 11/2006 |
| JP | 2009-203348 | 9/2009 |
| JP | 2009-293021 | 12/2009 |
| JP | 4624845 | 2/2011 |
| JP | 5142938 | 2/2013 |
| TW | 200535160 | 11/2005 |
| TW | 201107396 | 3/2011 |
| TW | 201202277 | 1/2012 |
| WO | 2010/119730 | 10/2010 |

OTHER PUBLICATIONS

Extended European Search Report for European Patent Application No. 13881048.6, dated Feb. 13, 2017, 8 pages.
Office Action issued for counterpart Chinese Patent Application No. 201380075404.0, dated Mar. 22, 2017, 19 pages including partial English translation.
International Search Report issued in International Application No. PCT/JP2013/003993, dated Oct. 1, 2013, 2 pages.
International Preliminary Report on Patentability, issued in International Application No. PCT/JP2013/003993, dated Oct. 6, 2013, 6 pages.
Office Action issued in corresponding Taiwanese Patent Application No. 10420088720, dated Jan. 22, 2015, 17 pages with a partial English Translation.

* cited by examiner

*Primary Examiner* — Peter D. Mulcahy
(74) *Attorney, Agent, or Firm* — Hamre, Schumann, Mueller & Larson, P.C.

(57) ABSTRACT

An object of the present invention is to provide a resin material capable of producing a molded body having few defects due to foreign substances, having high mechanical strength, very small in both orientation birefringence and photoelastic birefringence, and having high transparency, and having high transparency even when such a resin material is stretched. Provided is a resin composition containing a resin (A) and a multilayer structure polymer (B), wherein the multilayer structure polymer (B) has a crosslinked polymer layer and a hard polymer layer, and the hard polymer layer has at least two different hard polymer layers, at least one of which is a hard polymer layer (C) opposite in sign of a photoelastic constant to that of the resin (A).

30 Claims, No Drawings

RESIN COMPOSITION AND FILM THEREOF

TECHNICAL FIELD

The present invention relates to a resin composition and a film thereof.

BACKGROUND ART

Light-permeable resins are widely used as materials for forming film-, plate-, and lens-like optical members for use in various optical devices (e.g., films, substrates, and prism sheets for use in liquid crystal display devices; lenses in lens systems for signal reading of optical disk devices; and Fresnel lenses and lenticular lenses for projection screens). Such resins are generally called "optical resins" or "optical polymers."

Birefringence is one of important optical characteristics that should be taken into consideration when optical resins are used to form optical members. That is, in most cases, it is undesirable that optical resins have high birefringence. Particularly, in the above-mentioned applications (liquid crystal display devices, optical disk devices, projection screens, etc.), the presence of a birefringent film or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Meanwhile, as is well known in the art, birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

That is, orientation birefringence generally develops when main chains of a chain-like polymer (polymer chains) are oriented, and this orientation of main chains occurs in a process involving the flow of a material, such as an extrusion molding or stretching process during production of a polymer film or an injection molding process frequently used for production of optical members having various shapes, and is fixed and remains in an optical member. Hereinafter, the phrase "orientation birefringence is positive" means that the refractive index is large in a direction parallel to the orientation direction of polymer chains, and the phrase "orientation birefringence is negative" means that the refractive index is large in a direction orthogonal to the orientation direction of polymer chains.

On the other hand, photoelastic birefringence is caused by elastic deformation (distortion) of a polymer. In the case of an optical member formed by using a polymer, elastic deformation (distortion) occurs and remains in its material due to, for example, volume contraction caused by cooling from a temperature around the glass transition temperature of the polymer to a temperature lower than that, and causes photoelastic birefringence. Further, the material is elastically deformed also by, for example, external force exerted on the optical member fixed to a device used at ordinary temperature (glass transition temperature or lower), which causes photoelastic birefringence. Hereinafter, the phrase "photoelastic birefringence is positive" means that the refractive index is large in a direction parallel to a direction in which tensile stress is applied (direction in which polymer chains are oriented), and the phrase "photoelastic birefringence is negative" means that the refractive index is large in a direction orthogonal to a direction in which tensile stress is applied.

So far, there are various studies about reports on the suppression of birefringence.

For example, PTL 1 discloses a non-birefringent optical resin material obtained by blending two polymer resins that are opposite in sign of orientation birefringence to each other and are completely compatible. However, it is difficult to uniformly mix the two polymer resins described in PR, 1 to obtain a practical polymer resin that uniformly exhibits low orientation birefringence as a whole, and aggregates of the polymer resins may cause defects due to foreign substances. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of an example will have significantly high photoelastic birefringence. Further, the mechanical strength, especially impact resistance, of the optical resin material is not always sufficient, which causes problems such as cracks when the optical resin material is practically used.

PTL 2 discloses a method for obtaining a non-birefringent optical resin material by adding, to a matrix formed of a transparent polymer resin, a low molecular substance whose orientation birefringence tends to cancel out the orientation birefringence of the polymer resin material. The low molecular substance has a molecular weight of 5000 or less, and a resulting molded body has excellent transparency. However, there is no description about improvement in photoelastic birefringence or mechanical strength. Further, there is a case where heat resistance is reduced.

PTL 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence or mechanical strength.

PTL 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which was unable to be achieved heretofore. However, the composition of the optical resin material is limited to some extent to make it possible to cancel out both orientation birefringence and photoelastic birefringence at the same time, and therefore the glass transition temperature of the optical resin material is as low as lower than 100° C., and there is a problem such as a reduction in mechanical strength. Further, there is also a problem that polymer decomposition occurs during molding perforated under such conditions that the optical resin material is retained at high temperature, such as melt-extrusion molding for forming a film.

In addition, in recent years, an acrylic resin film is expected to be developed for optical films as a resin film having relatively low birefringence. Reduction in weight and thickness of a film has rapidly advanced in displays, in particular, mobile displays, and further thinning is also required of an optical film used in such electronic devices. Therefore, with respect to the original film of an acrylic resin film, its thinning as well as improvement in mechanical strength by biaxial stretching has been considered. However, even after the biaxial stretching, the mechanical strength is not sufficient in some cases, and there are cases where film transport resistance, crack resistance at the time of actual use, and the occurrence of cracking or fine cracks in the trimming process at the time of film production or in the punching process of the device made by laminating the film cause a problem.

Then, for example, PTL 5 discloses a method for obtaining a resin composition, which has high heat resistance and exhibits excellent mechanical strength, especially bending resistance, when formed into a film, and an optical film. The resin composition and the optical film are obtained by using, in combination, an acrylic resin having a glass transition temperature of 120° C. or higher and a graft copolymer obtained by graft copolymerization of an acrylic rubber-like polymer and a vinyl group-polymerizable monomer ("core-shell"-type impact resistance improver, hereinafter also referred to as "core-shell polymer"). However, no data of orientation birefringence and photoelastic birefringence are shown in the examples, and therefore it is unclear whether the graft copolymer is effective at improving birefringence. Particularly, there is no description about improvement in photoelastic birefringence in the specification. PTL 5 states that the graft copolymer is added to improve mechanical strength. However, there is no description about the influence of the graft copolymer on birefringence and there is no description about the orientation birefringence and photoelastic birefringence in the examples, from which it is apparent that PTL 5 has no technical idea of imparting a function of adjusting birefringence to the graft copolymer.

PTL 6 discloses an optical film obtained by molding a resin composition containing an acrylic resin (A) and an acrylic rubber (B). The acrylic resin (A) is a heat-resistant acrylic resin (A-1) containing a repeating unit derived from a methacrylate monomer, a repeating unit derived from a vinyl aromatic monomer, a repeating unit derived from a methacrylate monomer having an aromatic group, and a cyclic acid anhydride repeating unit. This literature states that the optical film has high heat resistance and excellent trimming property and has excellent optical characteristics even when stretched. Although there is a description about improvement in trimming property, there is no description about the mechanical strength of the film other than trimming property, such as crack resistance on film bending, and therefore it is unclear from this literature whether the mechanical strength of the optical film is at such a level that the optical film can be practically used without problem. Further, optical films stretched 100% (stretched twice) in the examples have high birefringence (orientation birefringence), and none of the optical films of the examples is low in both orientation birefringence and photoelastic constant (photoelastic birefringence), and therefore improvement in birefringence is not sufficiently achieved. Further, as shown in the examples, the acrylic rubber (B) described in this literature is a so-called graft copolymer (core-shell polymer), and this literature states that the acrylic rubber (B) is added to improve mechanical strength while maintaining transparency such as haze. However, the influence of the acrylic rubber (B) on birefringence is not taken into consideration at all. For example, when a comparison is made between examples and comparative examples, the orientation birefringences of the optical films of examples to which the acrylic rubber (B) is added are adversely higher than those of optical films of comparative examples in which only the acrylic resin (A) is used, and the photoelastic constants (photoelastic birefringences) of the optical films of examples are equal to those of the optical films of comparative examples in which only the acrylic resin (A) is used. Further, the heat-resistant acrylic resin has a negative photoelastic constant, and the acrylic rubber (B) is also estimated to have a negative photoelastic constant from the composition thereof. Accordingly it is apparent that the acrylic rubber (B) deteriorates orientation birefringence and photoelastic birefringence, that is, this literature has no technical idea that the acrylic rubber (B) is used to adjust orientation birefringence and photoelastic birefringence.

CITATION LIST

Patent Literatures

PTL 1: U.S. Pat. No. 4,373,065
PTL 2: JP 3696649 B1.
PTL 3: JP 3648201 B1.
PTL 4: JP 4624845 B1
PTL 5: JP 2009-203348 A
PTL 6: JP 5142938 B1

SUMMARY OF INVENTION

Technical Problem

An object of the present invention is to provide a resin material capable of producing a molded body having few defects due to foreign substances, having high mechanical strength, very small in both orientation birefringence and photoelastic birefringence, and having high transparency, and having high transparency even when stretched.

Another object of the present invention is to provide a film that is very small in both orientation birefringence and photoelastic birefringence, excellent in transparency, has high mechanical strength, and has high transparency even when stretched.

Solution to Problem

In view of the above circumstances, the present inventors have repeated intensive studies and found that when a polymer alloy film consisting of two or more polymers as disclosed in PTL 1 is stretched, the haze becomes high after stretching and the transparency is significantly reduced even if the haze in the original film is low in the case where the compatibility between polymers mixed with each other is poor. Although the detailed mechanism is currently under consideration, it is possible to disperse the polymers, which are different from each other in the compatibility, to some extent by screw kneading or the like at the time of melt extrusion molding, and thus the transparency is easily ensured. In the stretching process, the film is stretched by applying tension to the film under a high temperature atmosphere above the glass transition temperature of the film. Because the polymer can move to some extent at the stage of no shearing, phase separation and aggregation of the polymers occur if the compatibility between them is poor, so that the transparency is believed to be deteriorated. As for the optical film as described in PTLs 2 to 4, the transparency of the stretched film in the case of stretching the film is not studied. Therefore, if the compatibility between the matrix resin and the low molecular substances is different from each other, such low molecular substances may be aggregated by stretching, resulting in deterioration of transparency. In addition, since the film is exposed to high temperature conditions at the time of its stretching, a low molecular organic compound may bleed out on the film surface. Meanwhile, in the acrylic resin film as disclosed in PTLs 5 and 6, the optical characteristics in the case of stretching a film are not sufficient.

As a result of further investigation, the present inventors have succeeded in producing a stretched film excellent in optical characteristics and transparency by blending a multilayer structure polymer with a different resin, wherein at least one layer of two or more hard polymer layers is opposite in sign of a photoelastic constant to that of the different resin, and thus completed the present invention.

That is, the present invention is as follows.

[1] A resin composition containing a resin (A) and a multilayer structure polymer (B), wherein the multilayer structure polymer (B) has a crosslinked polymer layer and a hard polymer layer, and the hard polymer layer has at least two different hard polymer layers, at least one of which is a hard polymer layer (C) opposite in sign of a photoelastic constant to that of the resin (A).

[2] The resin composition according to [1], wherein the resin (A) is an acrylic resin.

[3] The resin composition according to [1] or [2], wherein the hard polymer layer (C) is a hard polymer layer containing as a structural unit a vinyl-based monomer having an alicyclic structure, a heterocyclic structure, or an aromatic group.

[4] The resin composition according to any one of [1] to [3], wherein another hard polymer layer (D) of the different hard polymer layers is a (meth)acrylic hard polymer layer.

[5] The resin composition according to either one of [3] and [4], wherein the vinyl-based monomer having an alicyclic structure, a heterocyclic structure, or an aromatic group is a (meth)acrylic monomer.

[6] The resin composition according to any one of [1] to [5], wherein the crosslinked polymer layer is a soft crosslinked polymer layer.

[7] The resin composition according to any one of [1] to [6], wherein the photoelastic constant is $-4 \times 10^{-12}$ to $4 \times 10^{-12}$ $Pa^{-1}$.

[8] The resin composition according to any one of [1] to [7], wherein the orientation birefringence is $-1.7 \times 10^{-4}$ to $1.7 \times 10^{-4}$.

[9] The resin composition according to any one of [1] to [8], wherein the multilayer structure polymer (B) is a (meth)acrylic rubber-containing graft copolymer obtained by multistage polymerization, in which at least two stages of the multistage polymerization are polymerization of a monomer mixture (c) containing a vinyl-based monomer having an alicyclic structure, a heterocyclic structure, or an aromatic group and a monomer copolymerizable therewith in the presence of (meth)acrylic rubber-containing polymer particles and polymerization of a monomer mixture (d) containing an alkyl (meth)acrylate.

[10] The resin composition according to any one of [3] to [9], wherein the vinyl-based monomer having an alicyclic structure, a heterocyclic structure, or an aromatic group is a monomer represented by the following formula (4):

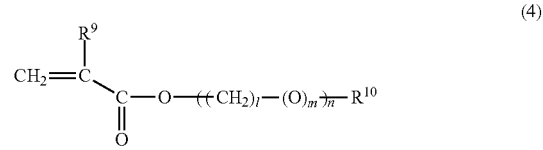

wherein $R^9$ is a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a monocyclic structure or a heterocyclic structure; l is an integer of 1 to 4; m is an integer of 0 to 1; and n is an integer of 0 to 10.

[11] The resin composition according to [10], wherein the monomer represented by the formula (4) is at least one member selected from the group consisting of benzyl (meth)acrylate, dicyclopentanyl (meth)acrylate, and phenoxyethyl (meth)acrylate.

[12] The resin composition according to any one of [9] to [11], wherein the monomer mixture (c) contains 1 to 100 wt % of a vinyl-based monomer having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the vinyl-based monomer having an alicyclic structure, a heterocyclic structure, or an aromatic group and the monomer copolymerizable therewith).

[13] The resin composition according to any one of [9] to [12], wherein the monomer mixture (d) contains 1 to 100 wt % of methyl (meth)acrylate, 99 to 0 wt % of a monomer copolymerizable therewith, and 0 to 2.0 parts by weight of a polyfunctional monomer (with respect to 100 parts by weight of the total amount of the methyl (meth)acrylate and the monomer copolymerizable therewith).

[14] The resin composition according to any one of [9] to [13], wherein the (meth)acrylic rubber-containing polymer particles have a rubber part formed by polymerizing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

[15] The resin composition according to any one of [1] to [14], wherein the multilayer structure polymer (B) is obtained by:

(B-1) polymerizing a monomer mixture containing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith) to give (meth)acrylic rubber-containing polymer particles, (B-2) polymerizing a monomer mixture containing 1 to 100 wt % of a vinyl-based monomer having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the vinyl-based monomer having an alicyclic structure, a heterocyclic structure, or an aromatic group and the monomer copolymerizable therewith) in the presence of the (meth)acrylic rubber-containing polymer particles to form a polymer layer (C), and (B-3) polymerizing a monomer mixture containing 1 to 100 wt % of an alkyl (meth)acrylate, 99 to 0 wt % of a monomer copolymerizable therewith, and 0 to 2.0 parts by weight of a polyfunctional monomer (100 parts by weight of the total amount of the alkyl (meth)acrylate and the monomer copolymerizable therewith) in the presence of the polymer obtained in (B-2) to form a polymer layer (D).

[16] The resin composition according to any one of [9] to [15], wherein the volume average particle diameter to the (meth)acrylic rubber part of the (meth)acrylic rubber-containing graft copolymer is 20 to 450 nm.

[17] The resin composition according to any one of [9] to [16], wherein the (meth)acrylic rubber content in the multilayer structure polymer (B) is 1 to 60 parts by weight with respect to 100 parts by weight of the resin composition.

[18] The resin composition according to any one of [1] to [17], further containing inorganic fine particles having birefringence.

[19] The resin composition according to any one of [1] to [18], further containing a low molecular compound having birefringence.

[20] The resin composition according to any one of [1] to [19], wherein the resin (A) is an acrylic resin having a cyclic structure.

[21] The resin composition according to any one of [1] to [20], wherein the resin (A) is at least one member selected from the group consisting of a glutarimide acrylic resin (E) having a unit represented by the following general formula (1) and a unit represented by the following general formula (2); a lactone ring-containing acrylic polymer; a partially hydrogenated styrene-based polymer obtained by partially hydrogenating an aromatic ring of a styrene-based polymer obtained by polymerizing a styrene monomer and a monomer copolymerizable therewith; a cyclic acid anhydride repeating unit-containing acrylic polymer, and a hydroxyl group- and/or carboxyl group-containing acrylic polymer:

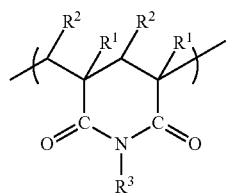

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent having 5 to 15 carbon atoms, and

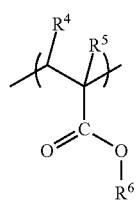

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent having 5 to 15 carbon atoms.

The resin composition according to [21], wherein the glutarimide acrylic resin (E) does not contain a unit represented by the following general formula (3):

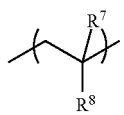

(3)

wherein $R^7$ is hydrogen or an alkyl group having 1 to 8 carbon atoms, and $R^8$ is an aryl group having 6 to 10 carbon atoms.

The resin composition according to any one of [1] to [22], wherein the glass transition temperature of the resin (A) is 100° C. or higher.

[24] A molded body of the resin composition according to any one of [1] to [23].

[25] A film made of the resin composition according to any one of [1] to [23].

[26] The film according to [25], which is molded by a melt extrusion method.

[27] The film according to [25] or [26], which has an orientation birefringence of $-1.7 \times 10^{-4}$ to $1.7 \times 10^{-4}$, a photoelastic constant of $-4.0 \times 10^{-12}$ to $4.0 \times 10^{-12}$ Pa$^{-1}$, a tensile elongation at break of 10% or more, and a haze of 2.0% or less.

[28] The film according to any one of [25] to [27], which has a thickness of 10 to 500 μm.

[29] A stretched film, which is formed by stretching the film according to any one of [25] to [28].

[30] The stretched film according to [29], which has a thickness of 10 to 500 μm.

[31] A resin composition containing the following resin (A) and polymer (B):
(A) an acrylic resin, and
(B) a multilayer structure polymer having a (meth)acrylic crosslinked polymer layer, a polymer layer having a (meth)acrylate having an alicyclic structure, a heterocyclic structure, or an aromatic group as a structural unit, and a polymer layer having an alkyl (meth)acrylate as a structural unit.

[32] A resin composition containing the following resin (A) and polymer (B):
(A) an acrylic resin, and
(B) a (meth)acrylic rubber-containing graft copolymer obtained by multistage polymerization including polymerization of a monomer mixture (c) containing a (meth)acrylate monomer having an alicyclic structure, a heterocyclic structure, or an aromatic group and a monomer copolymerizable therewith in the presence of (meth)acrylic rubber-containing polymer particles, and polymerization of a monomer mixture (d) containing an alkyl (meth)acrylate and a monomer copolymerizable therewith.

[33] The resin composition according to either one of [31] to [32], wherein the (meth)acrylate having an alicyclic structure, a heterocyclic structure, or an aromatic group is a (meth)acrylate monomer represented by the following formula (4):

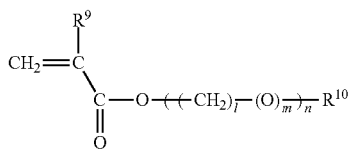

(4)

wherein $R^9$ is a substituted or unsubstituted alkyl group having 1 carbon atom, $R^{10}$ is a substituted or unsubstituted aromatic group having 1 to 24 carbon atoms, or a substituted or unsubstituted alicyclic group having 1 to 24 carbon atoms, and has a monocyclic structure or a heterocyclic structure, l is an integer of 1 to 4, m is an integer of 0 to 1, and n is an integer of 0 to 10.

[35] The resin composition according to [33], wherein the (meth)acrylate monomer represented by the formula (4) is at least one member selected from the group consisting of benzyl (meth)acrylate, dicyclopentanyl (meth)acrylate, and phenoxyethyl (meth)acrylate.

[35] The resin composition according to any one of [31] to [34], wherein the glass transition temperature of the resin (A) is 100° C. or higher.

[36] The resin composition according to any one of [32] to [35], wherein the monomer mixture (c) contains 1 to 100 wt % of a (meth)acrylate having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the (meth)acrylate having an alicyclic structure, a heterocyclic structure, or an aromatic group and the monomer copolymerizable therewith).

[37] The resin composition according to any one of [32] to [36], wherein the (meth)acrylic rubber-containing polymer particles have a rubber part formed by polymerization of 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

[38] The resin composition according to any one of [32] to [37], wherein the polymer (B) is obtained by:
(B-1) polymerizing a monomer mixture containing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith) to give (meth)acrylic rubber-containing polymer particles,
(B-2) polymerizing a monomer mixture containing 1 to 100 wt % of a (meth)acrylate having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the (meth)acrylate having an alicyclic structure, a heterocyclic structure, or an aromatic group, and the monomer copolymerizable therewith) in the presence of the (meth)acrylic rubber-containing polymer particles to form a polymer layer (C), and
(B-3) polymerizing a monomer mixture containing 1 to 100 wt % of an alkyl (meth)acrylate, 99 to 0 wt % of a monomer copolymerizable therewith, and 0 to 2.0 parts by weight of a polyfunctional monomer (with respect to 100 parts by weight of the total amount of the alkyl (meth)acrylate and the monomer copolymerizable therewith) in the presence of the polymer obtained in (B-2) to form a polymer layer (D).

[39] The resin composition according to any one of [32] to [37], wherein the volume average particle diameter to the (meth)acrylic rubber part of the (meth)acrylic rubber-containing graft copolymer is 20 to 450 nm.

[40] The resin composition according to any one of [32] to [38], wherein the content of the (meth)acrylic rubber in the polymer (B) is 1 to 60 parts by weight with respect to 100 parts by weight of the resin composition.

[41] The resin composition according to any one of [31] to [38], wherein the resin (A) is an acrylic resin having a cyclic structure.

[42] The resin composition according to any one of [31] to [40], wherein the resin (A) is at least one member selected from the group consisting of a glutarimide acrylic resin (E) having a unit represented by the following general formula (1) and a unit represented by the following general formula (2); a lactone ring-containing acrylic polymer, a partially hydrogenated styrene-based polymer obtained by partially hydrogenating an aromatic ring of a styrene-based polymer obtained by polymerizing a styrene monomer and a monomer copolymerizable therewith; a cyclic acid anhydride repeating unit-containing acrylic polymer; and a hydroxyl group- and/or carboxyl group-containing acrylic polymer:

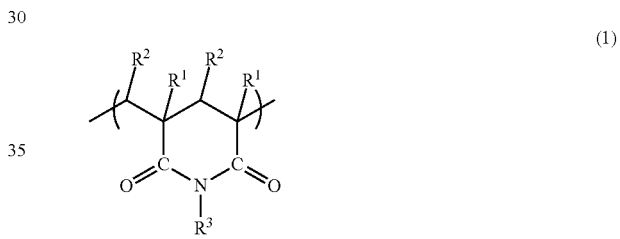

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent having 5 to 15 carbon atoms, and

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or a substituent having 5 to 15 carbon atoms containing an aromatic ring.

The resin composition according to [42], wherein the glutarimide acrylic resin (E) does not contain a unit represented by the following general formula (3):

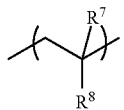

(3)

wherein $R^7$ is hydrogen or an alkyl group having 1 to 8 carbon atoms, and $R^8$ is an aryl group having 6 to 10 carbon atoms.

A molded body which is formed by molding the resin composition according to any one of [31] to [43].

[45] A film formed by molding the resin composition according to any one of [31] to [43].

[46] The film according to [45], which is molded by a melt extrusion method.

[47] The film according to [45] or [46], which has an orientation birefringence of $-1.7\times10^{-4}$ to $1.7\times10^{-4}$, a photoelastic constant of $-4.0\times10^{-12}$ to $4.0\times10^{-12}$ Pa$^{-1}$, and a haze of 2.0% or less.

(48) The film according to any one of [45] to [47], which has a thickness of 10 to 500 μm.

[49] A stretched film, which is formed by stretching the film according to any one of [45] to [48].

[50] The stretched film according to [49], which has a thickness of 10 to 500 μm.

[51] A film formed by molding a resin composition containing a resin (A) and a polymer (B), the film having an orientation birefringence of $-1.7\times10^{-4}$ to $1.7\times10^{-4}$, a photoelastic constant of $-4\times10^{-12}$ to $4\times10^{-12}$ Pa$^{-1}$, and a haze of 2.0% or less when the film is biaxially stretched twice.

[52] The film according to [51], wherein the resin (A) is an acrylic resin.

[53] The film according to either one of [51] to [52], wherein the photoelastic constant of the resin (A) is opposite in sign to that of the polymer (B).

[54] The film according to any one of [51] to [53], wherein the polymer (B) has a crosslinked structure.

[55] The film according to any one of [51] to [54], wherein the polymer (B) has a hard layer.

[56] The film according to any one of [51] to [55], wherein the polymer (B) is a multilayer structure polymer.

[57] The film according to any one of [51] to [56], wherein the polymer (B) is a multilayer structure polymer having a hard layer.

[58] The film according to any one of [51] to [57], wherein the polymer (B) has a crosslinked polymer layer and a hard polymer layer.

[59] The film according to any one of [51] to [58], wherein the polymer (B) has at least two different hard polymer layers, at least one of which is a hard polymer layer (C) having a photoelastic constant that is opposite in sign to that of the resin (A).

[60] The film according to any one of [51] to [59], wherein the polymer (B) has a (meth)acrylic crosslinked polymer layer.

[61] The film according to any one of [51] to [60], wherein the polymer (B) has a hard polymer layer (C) containing as a structural unit a vinyl-based monomer having an alicyclic structure, a heterocyclic structure, or an aromatic group, and a (meth)acrylic hard polymer layer (D).

[62] The film according to [61], wherein the vinyl-based monomer having an alicyclic structure, a heterocyclic structure, or an aromatic group is a (meth)acrylic monomer.

[63] The film according to either one of [61] to [62], wherein the vinyl-based monomer having an alicyclic structure, a heterocyclic structure, or an aromatic group is a vinyl-based monomer represented by the following formula (4):

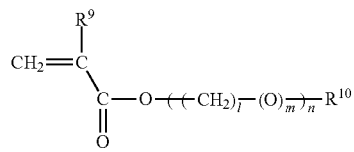

(4)

wherein $R^9$ is a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a monocyclic structure or a heterocyclic structure; l is an integer of 1 to 4; m is an integer of 0 to 1; and n is an integer of 0 to 10.

[64] The film according to [63], wherein the vinyl-based monomer represented by the formula (4) is a (meth)acrylate monomer.

[65] The film according to [64], wherein the vinyl-based monomer represented by the formula (4) is at least one member selected from the group consisting of benzyl (meth)acrylate, dicyclopentanyl (meth)acrylate, and phenoxyethyl (meth)acrylate.

[66] The film according to any one of [59] to [65], wherein the hard polymer layer (C) is formed by polymerizing 1 to 100 wt % of a vinyl-based monomer having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the vinyl-based monomer having an alicyclic structure, a heterocyclic structure, or an aromatic group and the monomer copolymerizable therewith).

[67] The film according to any one of [51] to [66], wherein the polymer (B) has a (meth)acrylic hard polymer layer formed by polymerizing 1 to 100 wt % of methyl (meth)acrylate, 99 to 0 wt % of a monomer copolymerizable therewith, and 0 to 2.0 parts by weight of a polyfunctional monomer (with respect to 100 parts by weight of the total amount of the methyl (meth)acrylate and the monomer copolymerizable therewith).

[68] The film according to any one of [51] to [67], wherein the polymer (B) has a crosslinked polymer layer formed by polymerizing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

[69] The film according to any one of [61] to [68], wherein the polymer (B) has a hard outer layer including the hard polymer layer (C) containing a vinyl-based monomer having an alicyclic structure, a heterocyclic structure, or an aromatic group as a structural unit, and the (meth)acrylic hard polymer layer (D).

[70] The film according to [69], wherein a soft layer having a (meth)acrylic crosslinked polymer layer is adjacent to the inner side of the hard outer layer of the polymer (B).

[71] The film according to any one of [61] to [70], wherein the polymer (B) has a soft inner layer and a hard outer layer, the inner layer has the (meth)acrylic crosslinked polymer layer, the outer layer has the hard polymer layer (C) containing as a structural unit a vinyl-based monomer having an alicyclic structure, a heterocyclic structure, or an aromatic group and the (meth)acrylic hard polymer layer (D).

[72] The film according to any one of [61] to [68], wherein the polymer (B) has a hard inner layer, a soft intermediate layer, and a hard outer layer, the inner layer is composed of at least one kind of hard polymer layer, the intermediate layer has a soft polymer layer of a (meth) acrylic crosslinked polymer, and the outer layer has the hard polymer layer (C) containing as a structural unit a vinyl-based monomer having an alicyclic structure, a heterocyclic structure, or an aromatic group and the (meth)acrylic hard polymer layer (D).

[73] The film according to [72], wherein the polymer (B) further has a soft innermost layer.

[74] The film according to any one of [60] to [73], wherein the volume average particle diameter to the (meth) acrylic crosslinked polymer layer of the polymer (B) is 20 to 450 nm.

[75] The film according to any one of [60] to [74], wherein the content of the (meth)acrylic crosslinked polymer contained in the polymer (B) is 1 to 60 parts by weight with respect to 100 parts by weight of the resin composition.

[76] The film according to any one of [51] to [75], wherein the resin composition further contains inorganic fine particles having birefringence.

[77] The film according to any one of [51] to [76], wherein the resin composition further contains a low molecular compound having birefringence.

[78] The film according to any one of [51] to [77], wherein the tensile elongation at break is 10% or more.

[79] A film having a tensile elongation at break of 10% or more, an orientation birefringence of $-1.7 \times 10^{-4}$ to $1.7 \times 10^{-4}$, a photoelastic constant of $-4 \times 10^{-12}$ to $4 \times 10^{-12}$ Pa$^{-1}$, and a haze of 2.0% or less when biaxially stretched twice.

[80] The film according to any one of [51] to [79], wherein the tensile elongation at break when biaxially stretched twice is 40% or more.

[81] The film according to any one of [51] to [80], which has a thickness of 10 to 500 μm.

[82] The film according to any one of [51] to [81], wherein the glass transition temperature is 100° C. or higher.

[83] The film according to any one of [51] to [82], which is an acrylic resin film.

[84] A stretched film which is formed by stretching the film according to any one of [51] to [83].

[85] An optical film formed of the film according to any one of [51] to [83] or of the stretched film according to [84].

[86] A laminate, which is formed by laminating the film according to any one of [51] to [83] or the stretched film according to [84] as a substrate.

[87] The resin composition according to any one of [31] and [33] to [35], wherein the polymer layer having a (meth)acrylate having an alicyclic structure, a heterocyclic structure, or an aromatic group as a structural unit is obtained by polymerizing a monomer mixture containing 1 to 100 wt % of a (meth)acrylate having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the (meth) acrylate having an alicyclic structure, a heterocyclic structure, or an aromatic group and the monomer copolymerizable therewith).

[88] The resin composition according to any one of [31], [33] to [35], and [87], wherein the (meth)acrylic crosslinked polymer layer is obtained by polymerizing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

[89] The resin composition according to any one of [31], [33] to [35], and [87] to [88], wherein the multilayer structure polymer (B) is obtained by:
(B-1) polymerizing a monomer mixture containing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith) to give a (meth) acrylic crosslinked polymer layer,
(B-2) polymerizing a monomer mixture containing 1 to 100 wt % of a (meth)acrylate having an alicyclic structure, a heterocyclic structure, or an aromatic group, 99 to 0 wt % of a monomer copolymerizable therewith, and 0 to 2.0 parts by weight of a polyfunctional monomer (with respect to 100 parts by weight of the total amount of the (meth)acrylate having an alicyclic structure, a heterocyclic structure, or an aromatic group and the monomer copolymerizable therewith) in the presence of the (meth)acrylic crosslinked polymer layer to form a polymer layer having a (meth)acrylate having an alicyclic structure, a heterocyclic structure, or an aromatic group as a structural unit, and
(B-3) polymerizing a monomer mixture containing 1 to 100 wt % of an alkyl (meth)acrylate, 99 to 0 wt % of a monomer copolymerizable therewith, and 0 to 2.0 parts by weight of a polyfunctional monomer (with respect to 100 parts by weight of the total amount of the alkyl (meth)acrylate and the monomer copolymerizable therewith) in the presence of the polymer obtained in (B-2) to form a polymer layer having an alkyl (meth)acrylate as a structural unit.

[90] The resin composition according to any one of [31], [33] to [35], and [87] to [89], wherein the volume average particle diameter to the (meth)acrylic crosslinked polymer layer of the multilayer structure polymer is 20 to 450 nm.

[91] The resin composition according to any one of [31], [33] to [35], and [87] to [90], wherein the content of the (meth)acrylic crosslinked polymer layer contained in the multilayer structure polymer is 1 to 60 parts by weight with respect to 100 parts by weight of the resin composition.

Advantageous Effects of Invention

The resin composition of the present invention is capable of producing a molded body having few defects due to foreign substances, having high mechanical strength, very small in both orientation birefringence and photoelastic birefringence, and having high transparency, and maintaining high transparency even when it is stretched, and is suitable for an optical member.

The film of the present invention is very small in both orientation birefringence and photoelastic birefringence, excellent in transparency, has high mechanical strength, and has high transparency even when it is stretched. Therefore, the film is suitable for an optical film.

DESCRIPTION OF EMBODIMENTS

Hereinafter, the embodiments of the present invention will be described in detail. However, the present invention is not limited to these embodiments.

The resin composition of the present invention contains, as essential components, a resin (A) and a multilayer structure polymer (B).

(Resin (A))

In the present invention, a resin generally having transparency can be used as the resin (A). Specific examples of the resin (A) include a wide variety of transparent thermoplastic resins, such as polycarbonate resins typified by bisphenol A polycarbonate; aromatic vinyl-based resins and hydrogenated products thereof, such as polystyrene, styrene-acrylonitrile copolymers, styrene-maleic anhydride resins, styrene-maleimide resins, styrene-(meth)acrylic acid resins, and styrene-based thermoplastic elastomers; polyolefin-based resins, such as amorphous polyolefins, transparent polyolefins with a microcrystalline phase, and ethylene-methyl methacrylate resins; acrylic resins, such as poly(methyl methacrylate) and styrene-methyl methacrylate resins and heat-resistant acrylic resins obtained by modifying the acrylic resins by, for example, imide cyclization, lactone cyclization, or denaturation with methacrylic acid; amorphous polyester resins or transparent polyester resins with a microcrystalline phase, such as polybutylene terephthalate, polyethylene terephthalate or polyethylene terephthalate partially denatured with a cyclohexanedimethylene group or isophthalic acid, polyethylene naphthalate, and polyarylate; polyimide resins; polyethersulfone resins; polyamide resins; cellulose-based resins, such as triacetylcellulose resins; and polyphenylene oxide resins. In consideration of practical use, the resin is preferably selected so that a resulting molded body has a total light transmittance of 85% or more, preferably 90% or more, more preferably 92% or more.

Among these resins, acrylic resins are particularly preferred for their excellent optical characteristics, heat resistance, and molding processability. Any acrylic resin may be used as long as it is a resin obtained by polymerization of a vinyl-based monomer containing an alkyl (meth)acrylate, but an acrylic resin obtained by polymerization of 30 to 100 wt % of methyl methacrylate and 70 to 0 wt % of a monomer copolymerizable therewith is preferred.

A preferred example of a different vinyl monomer copolymerizable with methyl methacrylate is a (meth)acrylate (except for methyl methacrylate) whose alkyl residue has 1 to 10 carbon atoms. Specific examples of such different vinyl-based monomer copolymerizable with methyl methacrylate include: methacrylates such as ethyl methacrylate, butyl methacrylate, cyclohexyl methacrylate, benzyl methacrylate, glycidyl methacrylate, epoxycyclohexylmethyl methacrylate, 2-hydroxyethyl methacrylate, 2-hydroxypropyl methacrylate, dicyclopentanyl methacrylate, 2,2,2-trifluoroethyl methacrylate, 2,2,2-trichloroethyl methacrylate, and isobornyl methacrylate; acrylates such as methyl acrylate, ethyl acrylate, butyl acrylate, 2-ethylhexyl acrylate, glycidyl acrylate, epoxycyclohexylmethyl acrylate, 2-hydroxyethyl acrylate, and 2-hydroxypropyl acrylate; carboxylic acids such as methacrylic acid and acrylic acid and esters thereof; vinyl cyanides such as acrylonitrile and methacrylonitrile; vinyl arenes such as styrene, α-methylstyrene, monochlorostyrene, and dichlorostyrene; maleic acid, fumaric acid and esters thereof, vinyl halides such as vinyl chloride, vinyl bromide, and chloroprene; vinyl acetate; alkenes such as ethylene, propylene, butylene, butadiene, and isobutylene; halogenated alkenes; and polyfunctional monomers such as allyl methacrylate, diallyl phthalate, triallyl cyanurate, monoethyleneglycol dimethacrylate, tetaethyleneglycol dimethacrylate, tetraethyleneglycol dimethacrylate, and divinyl benzene. These vinyl-based monomers may be used singly or in combination of two or more of them.

The acrylic resin contains methyl methacrylate preferably in an amount of 30 to 100 wt %, more preferably 50 to 99.9 wt %, further preferably 50 to 98 wt % and the monomer copolymerizable with methyl methacrylate preferably in an amount of 70 to 0 wt %, more preferably 50 to 0.1 wt %, further preferably 50 to 2 wt %. If the methyl methacrylate content is less than 30 wt %, optical characteristics, appearance, weather resistance, and heat resistance specific to acrylic resins tend to be degraded. Further, from the viewpoint of processability and appearance, it is preferred that a polyfunctional monomer is not used.

The glass transition temperature of the resin (A) used in the present invention can be set according to use conditions and intended use, but is preferably 100° C. or higher, more preferably 110° C. or higher, even more preferably 115° C. or higher, most preferably 120° C. or higher.

A specific example of an acrylic resin having a glass transition temperature of 120° C. or higher is an acrylic resin containing a glutarimide structure, a cyclic acid anhydride (for example, glutaric anhydride) structure, a (meth)acrylic acid unit, or a lactone structure in its molecule. Examples of such an acrylic resin include glutarimide acrylic resins, glutaric anhydride acrylic resins, lactone-cyclized acrylic resins, hydroxyl group- and/or carboxyl group-containing acrylic resins, and methacrylic resins. Examples of other usable resins having a glass transition temperature of 120° C. or higher include partially-hydrogenated styrene-based polymers obtained by partial hydrogenation of aromatic rings of a styrene-based polymer obtained by polymerization of a styrene monomer and a monomer copolymerizable therewith; polymers containing a cyclic acid anhydride repeating unit; polyethylene terephthalate resins; and polybutylene terephthalate resins. Among them, a glutarimide acrylic resin (E) described below is particularly preferably used because a resulting film has improved heat resistance and also has excellent optical characteristics when stretched.

(Glutarimide Acrylic Resin (E))

The glutarimide acrylic resin (E) has a glass transition temperature of 120° C. or higher and contains a unit represented by the following general formula (1) and a unit represented by the following general formula (2).

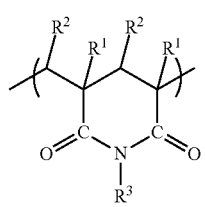

(1)

In the general formula (1), $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent having 5 to 15 carbon atoms. Hereinafter, the unit represented by the general formula (1) is also referred to as "glutarimide unit."

In the general formula (1), $R^1$ and $R^2$ are preferably each independently hydrogen or a methyl group, and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin (E) may contain only one kind of glutarimide unit or two or more kinds of glutarimide units wherein any one or all of $R^1$, $R^2$, and $R^3$ in the general formula (1) are different.

The glutarimide unit can be formed by imidizing a (meth)acrylate unit represented by the following general formula (2). Alternatively, the glutarimide unit may be formed by imidizing an acid anhydride (e.g. maleic anhydride), a half ester obtained from the acid anhydride and a linear or branched alcohol having 1 to 20 carbon atoms, or an α,β-ethylenically unsaturated carboxylic acid (e.g., acrylic acid, methacrylic acid, maleic acid, itaconic acid, crotonic acid, fumaric acid, or citraconic acid).

The glutarimide unit content of the glutarimide acrylic resin (E) is not particularly limited, and can be appropriately determined in consideration of, for example, the structure of $R^3$. However, the glutarimide unit content is preferably 1.0 wt % or more, more preferably 3.0 to 90 wt %, even more preferably 5.0 to 60 wt % with respect to the total weight of the glutarimide acrylic resin (E). If the glutarimide unit content is less than the above range, a resulting glutarimide acrylic resin (E) tends to be poor in heat resistance or tends to have impaired transparency. On the other hand, if the glutarimide unit content exceeds the above range, heat resistance and melt viscosity become unnecessarily high, which tends to deteriorate molding processability, significantly decrease the mechanical strength of a resulting film when the film is processed, or impair the transparency.

The glutarimide unit content is calculated in the following manner.

The resin is subjected to $^1$H-NMR analysis using $^1$H-NMR BRUKER Avance III (400 MHz) to determine the amount (mol %) of each monomer unit, such as a glutarimide unit or an ester unit contained in the resin, and then the monomer unit content (mol %) is converted to a content (wt %) using the molecular weight of each monomer unit.

For example, when the resin is formed of a glutarimide unit whose $R^3$ in the general formula (1) is a methyl group and a methyl methacrylate unit, a glutarimide unit content (wt %) can be determined from the following calculation formula using the area a of a peak derived from protons of O—CH$_3$ of methyl methacrylate and appearing at about 3.5 to 3.8 ppm and the area b of a peak derived from protons of N—CH$_3$ of glutarimide and appearing at about 3.0 to 3.3 ppm.

[Methyl methacrylate unit content $A$ (mol %)]=100× $a/(a+b)$

[Glutarimide unit content $B$ (mol %)]=100×$b/(a+b)$

[Glutarimide unit content (wt %)]=100×($b$×(molecular weight of glutarimide unit)/($a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount (mol %) of each monomer unit contained in the resin and the molecular weight of each monomer unit.

When the resin composition of the present invention is used for, for example, a polarizer protective film, the glutarimide unit content is preferably 20 wt % or less, more preferably 15 wt % or less, even more preferably 10 wt % or less because birefringence is more easily suppressed.

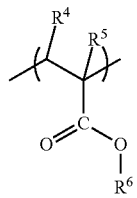

(2)

In the general formula (2), $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent having 5 to 15 carbon atoms. Hereinafter, the unit represented by the general formula (2) is also referred to as "(meth)acrylate unit." It is to be noted that in the present application, "(meth)acrylic" refers to "methacrylic or acrylic."

In the general formula (2), $R^4$ and $R^5$ are preferably each independently hydrogen or a methyl group, and $R^6$ is preferably hydrogen or a methyl group, and $R^4$, $R^5$, and $R^6$ are more preferably hydrogen, a methyl group, and a methyl group, respectively.

The glutarimide acrylic resin (E) may contain only one kind of (meth)acrylate unit or two or more kinds of (meth) acrylate units wherein any one or all of $R^4$, $R^5$, and $R^6$ in the general formula (2) are different.

If necessary, the glutarimide acrylic resin (E) may further contain a unit represented by the following general formula (3) (hereinafter, also referred to as "aromatic vinyl unit"):

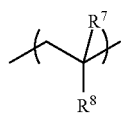

(3)

wherein $R^7$ is hydrogen or an alkyl group having 1 to 8 carbon atoms, and $R^8$ is an aryl group having 6 to 10 carbon atoms.

The aromatic vinyl unit represented by the general formula (3) is not particularly limited, and examples thereof include a styrene unit and an α-methylstyrene unit. The aromatic vinyl unit is preferably a styrene unit.

The glutarimide acrylic resin (E) may contain only one kind of aromatic vinyl unit or two or more kinds of aromatic vinyl units wherein either one or both of $R^7$ and $R^8$ are different.

The aromatic vinyl unit content of the glutarimide acrylic resin (E) is not particularly limited, but is preferably 0 to 50 wt %, more preferably 0 to 20 wt %, particularly preferably 0 to 15 wt % with respect to the total weight of the glutarimide acrylic resin (E). If the aromatic vinyl unit content exceeds the above range, the glutarimide acrylic resin (E) cannot have sufficient heat resistance.

However, in the present invention, the glutarimide acrylic resin (E) preferably contains no aromatic vinyl unit from the viewpoint of improving bending resistance and transparency, reducing fish eyes, and improving solvent resistance or weather resistance.

If necessary, the glutarimide acrylic resin (E) may further contain a different unit other than the glutarimide unit, the (meth)acrylate unit, and the aromatic vinyl unit.

Examples of the different unit include amide-based units (e.g. an acrylamide and a methacrylamide), glutaric anhydride units, nitrile-based units (e.g. acrylonitrile and methacrylonitrile), and maleimide-based units (e.g. maleimide, N-methylmaleimide, N-phenylmaleimide, and N-cyclohexylmaleimide).

The different unit may be incorporated into the glutarimide acrylic resin (E) by random copolymerization or graft copolymerization.

The different unit may be incorporated by copolymerization of a monomer constituting the different unit with the glutarimide acrylic resin (E) and/or a resin as a raw material for producing the resin (E). Alternatively, the different unit incorporated into the resin (E) may be a by-product of the above-mentioned imidization reaction.

The weight average molecular weight of the glutarimide acrylic resin (E) is not particularly limited, but is preferably in the range of $1 \times 10^{-4}$ to $5 \times 10^5$. By setting the weight average molecular weight of the glutarimide acrylic resin (E) to a value within the above range, it is possible to prevent deterioration of molding processability or to prevent a resulting film from having poor mechanical strength when the film is processed. On the other hand, if the weight average molecular weight is less than the above range, a resulting film tends to have poor mechanical strength. Further, if the weight average molecular weight exceeds the above range, viscosity during melt extrusion tends to be high, molding processability tends to be deteriorated, and productivity of a molded article tends to be reduced.

The glass transition temperature of the glutarimide acrylic resin (E) is 120° C. or higher so that a resulting film can have excellent heat resistance. Preferably, the glass transition temperature of the glutarimide acrylic resin (E) is 125° C. or higher. If the glass transition temperature of the glutarimide acrylic resin (E) is lower than the above range, a resulting film cannot have sufficient heat resistance.

Hereinbelow, one example of a method for producing the glutarimide acrylic resin (E) will be described.

First, a (meth)acrylate polymer is produced by polymerization of a (meth)acrylate. When the glutarimide acrylic resin (E) contains an aromatic vinyl unit, a (meth)acrylate-aromatic vinyl copolymer is produced by copolymerization of a (meth)acrylate and an aromatic vinyl compound.

The (meth)acrylate used in this step is, for example, preferably methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylates may be used singly or in combination of two or more of them. The use of two or more kinds of (meth)acrylates makes it possible to finally obtain a glutarimide acrylic resin (E) containing two or more kinds of (meth)acrylate units.

The structure of the (meth)acrylate polymer or the (meth)acrylate-aromatic vinyl copolymer is not particularly limited as long as a subsequent imidization reaction can be performed. More specifically, the (meth)acrylate polymer or the (meth)acrylate-aromatic vinyl copolymer may be a linear polymer, a block polymer, a core-shell polymer, a branched polymer, a ladder polymer, or a crosslinked polymer.

In the case of a block polymer, the block polymer may be any one of an A-B-type block polymer, an A-B-C-type block polymer, an A-B-A-type block polymer, and another type of block polymer. In the case of a core-shell polymer, the core-shell polymer may be one composed of only one core layer and one shell layer or one whose core and/or shell are/is multi-layered.

Then, the (meth)acrylate polymer or the (meth)acrylate-aromatic vinyl copolymer is reacted with an imidization agent to perform an imidization reaction. In this way, a glutarimide acrylic resin (E) can be produced.

The imidization agent is not particularly limited as long as the glutarimide unit represented by the general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent used may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin (E) can be controlled by adjusting the ratio of the imidization agent to be added.

A method for performing the imidization reaction is not particularly limited, and a conventionally known method can be used. For example, the imidization reaction can be allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the raw material polymer, the imidization agent, and the ring-closing promoter).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the raw material polymer, the imidization agent, and the ring-closing promoter) can be further promoted.

The above-mentioned extruders may be used singly or in combination of two or more of them serially connected.

The production method of the glutarimide acrylic resin (E) may include, in addition to the above-mentioned imidization step, an esterification step in which treatment using an esterifying agent is performed. The esterification step makes it possible to convert carboxyl groups contained in the resin as a by-product of the imidization step to ester groups. This makes it possible to adjust the acid value of the glutarimide acrylic resin (E) to a value within a desired range.

The acid value of the glutarimide acrylic resin (E) is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin (E) can provide an excellent balance of heat resistance, mechanical properties, and molding processability. On the other hand, if the acid value exceeds the above range, foaming of the resin is likely to occur during melt extrusion for film formation, which tends to deteriorate molding processability and to reduce productivity of a molded article. It is to be noted that the acid value can be calculated by, for example, a titration method described in JP 2005-23272 A.

The esterifying agent is not particularly limited, and examples thereof include dimethyl carbonate, 2,2-dimethoxypropane, dimethyl sulfoxide, triethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilyl chloride, isopropenyl acetate, dimethyl urea, tetramethylammonium hydroxide, dimethyldiethoxysilane, tetra-N-butoxysilane, dimethyl (trimethylsilane) phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterifying agent to be used is not particularly limited, but is preferably 0 to 12 parts by weight, more preferably 0 to 8 parts by weight with respect to 100 parts by weight of the (meth)acrylate polymer or the (meth)acrylate-aromatic vinyl copolymer. By setting the amount of the esterifying agent to be used to a value within the above range, it is possible to adjust the acid value of the glutarimide acrylic resin (E) to a value within an appropriate range. On the other hand, if the amount of the esterifying agent to be used is not within the above range, there is a possibility that part of the esterifying agent will remain unreacted in the resin, which may cause foaming or odor generation when molding is performed using such a resin.

A catalyst may also be used in combination with the esterifying agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterifying agent. The heat treatment can be achieved by kneading and dispersing the melted resin in an extruder. When only the heat treatment is performed as the esterification step, part or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterifying agent, conversion to acid anhydride groups by heat treatment can be allowed to proceed in parallel. In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterifying agent, by-products such as methanol, or monomers.

The glutarimide acrylic resin (E) can also be produced using, instead of an extruder, a suitable high-viscosity reaction apparatus such as a horizontal twin screw reaction apparatus, such as BIVOLAK manufactured by Sumitomo Heavy Industries, Ltd., or a vertical twin screw stirring vessel such as SUPER BLEND.

When the glutarimide acrylic resin (E) is produced using a batch-type reactor (pressure vessel), the structure of the batch-type reactor (pressure vessel) is not particularly limited. More specifically, the batch-type reactor shall have a structure that allows the raw material polymer to be melted by heating and stirred and in which the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Examples of a batch-type reactor having such a structure include a stirring vessel MAX BLEND manufactured by Sumitomo Heavy Industries, Ltd.

In such a way as described above, the glutarimide acrylic resin (E) whose glutarimide unit content is controlled to a specific value can be easily produced.

In the present invention, the resin (A) may be used alone or may be used in combination of two or more thereof.

(Multilayer Structure Polymer (B))

The multilayer structure polymer (B) used in the present invention is an essential component to allow a resin composition to have extremely small birefringence and high optical isotropy by adding it to the resin (A) having birefringence. In order to achieve optical isotropy, how to reduce orientation birefringence and photoelastic birefringence is important. Therefore, the concepts of "orientation birefringence" and "photoelastic birefringence" of each of the resin (A), the multilayer structure polymer (B) and its hard polymer layer (C), the resin composition, and the film (molded body) in the present invention will be first described below.

Concept of Orientation Birefringence

When a film is produced not by molding performed under such conditions that a polymer is oriented in a film, such as high discharge conditions, film take-up conditions, or low temperature molding conditions, but by normal melt extrusion molding, a polymer is not very highly oriented in the film. Actually, in the case of an acrylic resin typified by PMMA, its film formed by melt extrusion without intentionally subjected to a stretching process (hereinafter, also referred to as "original film" or "raw material film") does not have very high birefringence, and therefore can sometimes be practically used without problem depending on its intended use. Of course, when a film is formed by molding performed under such conditions that a polymer is oriented or an original film is subjected to a stretching process, a polymer is oriented in the film so that the film has birefringence. Such birefringence is due to polymer orientation, and is therefore generally called orientation birefringence. As described above, the orientation birefringence of a molded body, especially a film, made of the resin composition of the present invention depends on how the resin composition of the present invention is molded or, in the case of a film, whether the film is stretched or not. In order to reduce the birefringence of the molded body obtained from the resin composition of the present invention, especially the film, it is necessary to set the orientation birefringence of the multilayer structure polymer (B) and the orientation birefringence of the hard polymer (C) in the multilayer structure polymer (B) to be opposite in sign to the orientation birefringence of the resin (A). Conversely, when polymer orientation hardly occurs in a molded body such as a film so that the birefringence of the molded body is sufficiently low, the orientation birefringence of the multilayer structure polymer (B) does not need to be greatly taken into consideration and is therefore not particularly limited in the resin design.

Here, the measuring conditions of "orientation birefringence" in the present invention will be defined as follows. As described above, orientation birefringence develops due to orientation of polymer chains, and birefringence (orientation birefringence) in a polymer film varies depending on the degree of orientation of polymer chains. Therefore, in the present invention, "orientation birefringence" is defined as measured under the following conditions.

Each of the resin (A), the resin composition, the multilayer structure polymer (B), and the hard polymer layer (C) of the multilayer structure polymer (B) needs to be formed into a some form of molded body for the measurement of its orientation birefringence. In the present invention, the molded body is defined as a film or sheet. Hereinbelow, measurement of orientation birefringence will be described with reference to a case where the molded body is a melt-extrusion molded film or a press-molded sheet.

It is to be noted that the sign of the orientation birefringence of the hard polymer layer (C) of the multilayer structure polymer (B) is measured after a polymer (homopolymer) obtained by homopolymerization of a monomer component of the hard polymer layer (C) is molded into a film or a sheet.

Measurement of "Orientation Birefringence" of Film

First, a test specimen of 25 mm×90 mm is cut out (so that the long sides are in the MD direction) from a film (original film) having a thickness of 125 μm, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C. and a sample is taken from the central portion of the film for the measurement of birefringence.

Measurement of "Orientation Birefringence" of Sheet

Since the multilayer structure polymer (B) has at least a crosslinked structure, it is difficult to form a film from the multilayer structure polymer (B) alone depending on the structure. Therefore, the multilayer structure polymer (B) is formed into a sheet (thickness 500 μm) by press molding to measure "orientation birefringence." There are cases where it is also difficult to form a film from a homopolymer of the hard polymer layer (C) depending on the composition and the molecular weight. Thus, even in the case where it is difficult to form a film from the homopolymer of the hard polymer layer (C), a sheet (thickness 500 μm) is formed by press molding to measure orientation birefringence.

In the present invention, whether the "sign of orientation birefringence" of the multilayer structure polymer (B) and the hard polymer layer (C) of the multilayer structure polymer (B) is the same or opposite to that of the resin (A) is confirmed in a press-molded sheet.

Specifically, the multilayer structure polymer (B) or the homopolymer of the hard polymer layer (C) is pressed at 190° C. to prepare a press-molded sheet having a thickness of 500 μm. A test specimen of 25 mm×90 mm is cut out from the central portion of the obtained press-molded sheet, both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in its longitudinal direction (at this time, both the long sides of the test specimen are not fixed). Thereafter, the thus obtained film is cooled to 23° C. and a sample is taken from the central portion of the film for the measurement of birefringence, and the sign of orientation birefringence is determined.

The above-mentioned "orientation birefringence" depends on the degree of polymer orientation, and is therefore influenced by various sample preparation conditions including stretching conditions. For this reason, evaluation conditions have been specified above. For example, the stretching temperature is preferably in the range of −30° C. to +30° C. of the glass transition temperature, more preferably in the range of +0° C. to +30° C. of the glass transition temperature, and may be appropriately set to a temperature in the range of, for example, +5° C. to +30° C. of the glass transition temperature. However, in order to determine the sign of birefringence of each sample and to quantitatively determine the relative magnitude relationship between samples, it is important to use measurement values obtained under the almost same measuring conditions such as stretching conditions.

Concept of Photoelastic Birefringence (Photoelastic Constant))

As has been described above, photoelastic birefringence is birefringence caused by elastic deformation (distortion) of a polymer in a molded body when stress is applied to the molded body. As shown by the following formula, a photoelastic constant is defined as a coefficient γ of Δσ at the time when a birefringence difference Δn is caused by a stress difference Δσ.

$$\Delta n = \gamma \Delta \sigma$$

Here, when the refractive index increases in a direction parallel to the direction in which a tensile stress is being applied (the latter is the orientation direction of the polymer chains), this case is expressed as "photoelastic birefringence is positive" and when the refractive index increases in a direction perpendicular to the direction in which a tensile stress is being applied, this case is expressed as "photoelastic birefringence is negative."

In fact, the intrinsic "photoelastic constant" of the polymer is determined, which makes it possible to evaluate the degree of photoelastic birefringence of the material. First, stress is applied to the polymer material, and birefringence is measured when the polymer material is elastically distorted. A proportional constant between the obtained birefringence and the stress is defined as a photoelastic constant. The birefringences of polymers at the time when stress is applied to the polymers can be evaluated by comparing the photoelastic constants of the polymers.

As in the case of the measurement of orientation birefringence, the resin composition or the like is molded into a film or a sheet to measure a photoelastic constant. Hereinbelow, the measurement of photoelastic constant will be described with reference to a case where the molded body is a melt-extrusion molded film or a press-molded sheet.

Measurement of "Photoelastic Constant" of Film

As in the case of the above-mentioned "orientation birefringence," a strip-shaped test specimen of 15 mm×90 mm is cut out in a TD direction (so that the long side is in the TD direction) from a film (original film) having a thickness of 125 μm. Then, one of the long sides of the test specimen is fixed, and a load is applied to the other long side while increasing the load from 0 kgf to 4 kgf by 0.5-kgf increments. In this state, birefringence at the application of each load is measured at 23° C. The magnitude of a change in birefringence per unit stress is calculated from the obtained results to determine a photoelastic constant.

Measurement of "Photoelastic Constant" of Sheet

When it is difficult to form a film from the multilayer structure polymer (B) or from a homopolymer of the hard polymer layer (C), a sheet is formed by press molding for the measurement of birefringence to determine a photoelastic constant.

In the present invention, whether the "sign of photoelastic birefringence" of each of the multilayer structure polymer (B) and the hard polymer layer (C) of the multilayer structure polymer (B) is the same or opposite to that of the resin (A) is confirmed in a press-molded sheet.

Specifically, the multilayer structure polymer (B) or the homopolymer of the hard polymer layer (C) is pressed at 190° C. to prepare a press-molded sheet having a thickness of 500 μm. Then, a test specimen of 25 mm×90 mm is cut out from the central portion of the obtained press-molded sheet.

The measuring conditions are the same as those used in the case of the measurement of the melt-extrusion molded film.

When there is a large difference in thickness between samples to be compared, there is a possibility that how stress is applied in the samples varies, resulting in difficulty to strictly compare photoelastic constants between the samples. However, as for the sample of the film having a thickness of 125 μm and the sample of the press-molded sheet having a thickness of 500 μm described in the present invention, there is not a large difference in how stress is applied between them, and therefore it is possible to compare photoelastic constants between the samples as long as a difference in thickness between the samples is at such a level. Therefore, both the film and the press-molded sheet can be appropriately used to measure a photoelastic constant (birefringence), but the film is preferably used. In the present invention, a press-molded sheet having a thickness of 500 μm is used as a means for determining the sign of photoelastic constant of each of the multilayer structure polymer (B) and the homopolymer of the hard polymer layer (C). The same applies to the measurement of orientation birefringence.

Since photoelastic birefringence is an intrinsic property in the polymer structure, at least one hard polymer layer (C) of two or more hard polymer layers in the multilayer structure polymer (B) is designed to have a photoelastic constant which is opposite in sign to that of the resin (A). With respect to the amount of the multilayer structure polymer (B), the polymer (B) needs to be added in such an amount that the photoelastic birefringence of the resin (A) can be cancelled out. It is known that additivity is established between the photoelastic constant of a resulting polymer (copolymer) and the photoelastic constants of homopolymers corresponding to monomer species used for copolymerization. From this fact, when the photoelastic constant of the multilayer structure polymer (B) is opposite in sign to the photoelastic constant of the resin (A) and is larger in its absolute value than that of the resin (A), the amount of such polymer (B) that needs to be added to reduce the photoelastic birefringence of the resin composition containing the resin (A) and the multilayer structure polymer (B) can be made smaller.

As for orientation birefringence, as described above, when the degree of polymer orientation in a molded body, especially in a film, made of the resin composition of the present invention is not so high and therefore the orientation birefringence of the molded body does not cause a problem when the molded body is practically used, it is not necessary to adjust the orientation birefringence in the design of the multilayer structure polymer (B) and/or the hard polymer layer (C). However, when the orientation birefringence of the resulting molded body causes a problem in its practical use, the orientation birefringence of the multilayer structure polymer (B) and/or the hard polymer layer (C) is preferably made opposite in sign to the orientation birefringence of the resin (A).

The above technical idea is important to realize the reduction in birefringence of the resin composition and the film that are provided in the present invention.

The multilayer structure polymer (B) of the present invention shall be a polymer having a weight average molecular weight exceeding 5000, preferably 10000 or more, more preferably 20000 or more. If the weight average molecular weight is 5000 or less, there is a fear that the physical properties, such as mechanical properties, heat resistance, and hardness, of a resulting molded body are deteriorated or the appearance of a resulting molded body is impaired due to bleeding out on the surface of the molded body during high-temperature molding processing.

The multilayer structure polymer (B) has a crosslinked polymer layer and a hard polymer layer, and from the viewpoint of dispersibility, optical isotropy, and mechanical strength, such a polymer (B) is preferably a non-crosslinked hard polymer layer as the hard polymer layer. In general, a multilayer structure polymer is also referred to as a graft copolymer or a core-shell polymer, and the multilayer structure polymer (B) of the present invention includes these polymers.

In the present invention, a non-birefringent resin composition and a non-birefringent film that are very small in birefringence can be produced by adjusting the signs of the photoelastic birefringence of the resin (A) and the hard polymer layer (C) of the multilayer structure polymer (B) to the opposite ones and optionally adjusting the signs of the orientation birefringence of the resin (A) and the hard polymer layer (C) of the multilayer structure polymer (B) to the opposite ones. On the other hand, as described in U.S. Pat. No. 4,373,065, it is thought that non-birefringence can be achieved also when the two kinds of non-crosslinked polymers whose signs in birefringence are opposite to each other are blended. However, the fact that the signs in the birefringence are opposite to each other means that the structure of the two polymers is quite different, and such two polymers are essentially difficult to be completely compatible. Indeed, when two non-crosslinked polymers are blended, one of the polymers aggregates so that micron-sized domains or clearly visible large clusters, and moreover, surface irregularities are formed, and thereby transparency is impaired or foreign substances such as fish eyes are caused. Therefore, in order to allow two kinds of polymers to be easily completely compatible with each other, the polymers need to be designed in consideration of two factors of birefringence control and compatibility control, which significantly reduces the degree of freedom of polymer design. Under the circumstances, the multilayer structure polymer (B) of the present invention exhibits its characteristics. The multilayer structure polymer (B) has a crosslinked polymer layer and a hard polymer layer, and is designed so that the size per one (one particle) multilayer structure polymer (B) can be a submicron size of microparticles. In this case, when the multilayer structure polymer (B) is blended with the resin (A), a blend of the resin (A) and the multilayer structure polymer (B) has a sea-island structure in which submicron-sized microparticles of the multilayer structure polymer (B) are dispersed in the resin (A), and therefore the multilayer structure polymer (B) is less likely to endlessly aggregate to form clusters of several millimeters or centimeters that impair transparency or cause foreign substances such as fish eyes. As described above, the multilayer structure polymer (B) is previously designed to have a submicron size so that the dispersibility of the multilayer structure polymer (B) in the resin (A) can be controlled, and therefore the multilayer structure polymer (B) can be dispersed in the resin (A) even when the resin (A) and the multilayer structure polymer (B) are not completely compatible with each other. Therefore, importance can be given to birefringence control, and this increases the degree of freedom of polymer design of both the resin (A) and the multilayer structure polymer (B). However, when the film is stretched, depending on the stretching conditions, it cannot be said that there are cases where the resin (A) and the multilayer structure polymer (B) are not phase separated, and the transparency such as haze is not deteriorated. As described above, the original film has usually no problem because it is obtained by molding in a kneaded state such as melt-extrusion molding. In the case of further stretching the film, since the polymer is exposed to a high temperature that is equal to or higher than the glass transition temperature in the absence of shear such as kneading, the transparency is deteriorated (it is believed that aggregation due to phase separation of the resins occurs, and thus the transparency is deteriorated) if the compatibility between the resin (A) and the multilayer structure polymer (B) is poor. As a result of intensive studies on means for preventing this, it was revealed that a film even after stretching can achieve non-birefringence while maintaining excellent transparency, by having a hard polymer layer (C) that has an effect of cancelling out the birefringence of the resin (A) and a hard polymer layer (D) that is well compatible with the resin (A) in the multilayer structure polymer (B). The expected roles are divided into the hard polymer layer to control the birefringence and the hard polymer layer to improve the dispersibility of the multilayer structure polymer (B) in the matrix, such polymer (B) being compatible with the matrix. This is the second important technical idea.

Hereinbelow, the third important technical idea of the present invention will be described. There is a case where a molded body made of the resin composition of the present invention, especially an optical film, needs to have high heat resistance and mechanical strength. Particularly, when used as an optical film for liquid crystal displays, the molded body needs to have high heat resistance, because it is exposed to high temperature when subjected to a film coating process or the like during production as well as when practically used. Further, the molded body needs to have mechanical strength such as trimming property or crack resistance, because a punching process or the like is performed after film coating or bonding to another member as well as during film production. In this case, addition of the multilayer structure polymer (B) whose crosslinked polymer layer is "soft" to the resin (A) makes it possible to significantly improve mechanical strength and achieve high heat resistance at the same time. In order to obtain such an effect, the multilayer structure polymer (B) is preferably a graft copolymer (core-shell polymer) having a soft crosslinked polymer layer and a hard polymer layer. Usually, addition of a soft polymer is performed as one of the ways to improve mechanical strength, but in this case, a matrix resin (in this case, the resin (A)) and the soft polymer are uniformly mixed, which is disadvantageous in that a resulting molded body has low heat resistance. On the other hand, when the multilayer structure polymer (B) is a graft copolymer (core-shell polymer) having a soft crosslinked polymer layer and a hard polymer layer, a resulting molded body has a discontinuous sea-island structure in which the soft crosslinked polymer layer is "island" and the resin (A) and the hard polymer layer are "sea," and therefore it is possible to obtain an excellent effect that mechanical strength is improved and heat resistance is hardly reduced. Usually, a soft crosslinked polymer is different in composition from a matrix (resin(A)), and therefore it is difficult to uniformly disperse the soft crosslinked polymer in the matrix, which deteriorates optical characteristics such as transparency or causes defects such as fish eyes. However, as described above, when the polymer (B) has both a soft crosslinked polymer layer and a hard polymer layer, it is possible to uniformly disperse the soft crosslinked polymer in the matrix. Especially, in order to improve the transparency of the stretched film, it is preferable to raise the compatibility between the matrix and the hard polymer layer of the multilayer structure polymer (B).

The term "hard" as used herein means that the glass transition temperature of the polymer is 20° C. or higher. If the glass transition temperature of the polymer is lower than 20° C., there are problems such that not only the heat resistance of the resin composition blended with the multilayer structure polymer (B), and of the film is reduced, but also coarsening or agglomeration of the resin (B) are likely to occur during production of the multilayer structure polymer (B). The glass transition temperature of the polymer is preferably 30° C. or higher, more preferably 50° C. or higher.

1. Crosslinked Polymer Layer

First, the crosslinked polymer layer of the multilayer structure polymer (B) will be described.

When a crosslinked polymer layer does not need to have very high mechanical strength, the crosslinked polymer layer may be either "soft" or "hard," but a soft polymer layer is preferred. Having a soft crosslinked polymer layer in the multilayer structure polymer (B) makes it possible to significantly improve mechanical strength and achieve high heat resistance at the same time.

The term "soft" as used herein means that the glass transition temperature of the polymer is lower than 20° C. From the viewpoint of enhancing the impact absorption capacity of the soft crosslinked polymer layer and enhancing an impact resistance improving effect such as crack resistance, the glass transition temperature of the polymer is more preferably lower than 0° C., furthermore preferably lower than −20° C.

In the present application, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C., and the glass transition temperature of polybutyl acrylate is −54° C.).

As the "soft" crosslinked polymer layer, the glass transition temperature of the polymer has only to be lower than 20° C., and a rubber-like polymer is suitably used. Specific examples of the rubber-like polymer include butadiene-based crosslinked polymers, (meth)acrylic crosslinked polymers, and organosiloxane-based crosslinked polymers. Among them, (meth)acrylic crosslinked polymers (also referred to as "(meth)acrylic rubbers") are particularly preferred in terms of the weather resistance (light resistance) and transparency of the resin composition and the film.

Hereinbelow, a (meth)acrylic crosslinked polymer layer will be described in detail as a preferred "soft" crosslinked polymer layer.

A (meth)acrylic crosslinked polymer in the (meth)acrylic crosslinked polymer layer is not particularly limited as long as it is a (meth)acrylic crosslinked polymer, but is preferably one obtained by polymerization of 50 to 100 wt % of an alkyl acrylate, 50 to 0 wt % of a vinyl monomer copolymerizable with the alkyl acrylate, and 0.05 to 10 parts by weight of a polyfunctional monomer (with respect to 100 parts by weight of the total amount of the alkyl acrylate and the vinyl monomer copolymerizable therewith) from the viewpoint of impact resistance such as crack resistance. The (meth)acrylic crosslinked polymer layer may be a layer obtained by one-stage polymerization performed by mixing all the monomer components or a layer obtained by polymerization performed in two or more stages while changing the composition of monomers.

The alkyl acrylate used here is preferably one whose alkyl group has 1 to 12 carbon atoms from the viewpoint of polymerization reactivity and cost, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, benzyl acrylate, n-octyl acrylate, P-hydroxyethyl acrylate, dimethylaminoethyl acrylate, and glycidyl acrylate, and these monomers may be used singly or in combination of two or more of them. The amount of the alkyl acrylate is preferably 50 to 100 wt %, more preferably 60 to 100 wt %, most preferably 70 to 100 wt % with respect to the total amount of the monofunctional monomers (with respect to the total amount of the alkyl acrylate and the vinyl monomer copolymerizable therewith). If the amount of the alkyl acrylate is less than 50 wt %, there is a case where the crack resistance of the film is deteriorated.

As an example of the monomer copolymerizable with the alkyl acrylate (hereinafter, sometimes referred to as "copolymerizable monomer"), an alkyl methacrylate can be mentioned. From the viewpoint of polymerizability and cost, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate. Other examples of the copolymerizable monomer include: vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; methacrylamides such as methacrylamide; and acrylamides such as acrylamide and N-methylolacrylamide. These monomers may be used in combination of two or more of them.

The above-mentioned monofunctional monomer is copolymerized with a polyfunctional monomer having two or more non-conjugated reactive double bonds per molecule, and as a result, a crosslinked polymer (rubber) is obtained. Examples of the polyfunctional monomer used here include allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used in combination of two or more of them.

The amount of the polyfunctional monomer to be added to the monofunctional monomers is preferably 0.05 to 10 parts by weight, more preferably 0.1 to 5 parts by weight with respect to 100 parts by weight of the total amount of the monofunctional monomers. If the amount of the polyfunctional monomer to be added is less than 0.05 part by weight, formation of a crosslinked polymer tends to be impossible. On the other hand, if the amount of the polyfunctional monomer to be added exceeds 10 parts by weight, the film tends to have low crack resistance.

The multilayer structure polymer (B) may have at least one crosslinked polymer layer, but may have two or more such layers. The multilayer structure polymer (B) may have either of a soft layer and a hard layer as long as it is a crosslinked polymer layer, and preferably has at least one soft crosslinked polymer layer, and may further have a hard crosslinked polymer layer. Such a crosslinked polymer layer is not particularly limited as long as its glass transition temperature is 20° C. or higher, and specifically, the monomers described in the description of the "soft" crosslinked polymer layer can be used as appropriate.

2. Hard Polymer Layer

The multilayer structure polymer (B) has at least two different hard polymer layers and has the functions of (1) uniformly dispersing the multilayer structure polymer (B) in the resin (A) and allowing a film after stretching to have good transparency and (2) cancelling out the birefringence of the resin (A) to improve the optical isotropy of the resin composition and the film of the present invention.

The function (1) can be achieved by appropriately selecting a monomer in such a manner that at least one layer of the hard polymer layer is easily compatible with the resin (A) and polymerizing such a monomer.

When the orientation birefringence of a molded body such as a film is not so high and therefore does not cause a problem in its practical use, such as when a molded body is not subjected to a stretching process, the function (2) can be achieved by allowing the photoelastic constant of at least one layer of the hard polymer layers to be opposite in sign to that of the resin (A) so that the molded body has a very small photoelastic constant. On the other hand, when the orientation birefringence of a molded body such as a film is relatively large and therefore causes a problem in its practical use, such as when a molded body is subjected to a stretching process, the function (2) can be achieved by allowing both the photoelastic constant and orientation birefringence of the hard polymer layer to be opposite in sign to those of the resin (A) so that not only the photoelastic constant of the molded body but also the orientation birefringence of the molded body is very small. This is a hard polymer layer (C) of the present invention whose photoelastic constant is opposite in sign to that of the resin (A).

The multilayer structure polymer (B) showing the effects of the present invention can be variously designed.

Orientation of the polymer chains occurs during formation of molded bodies or films from the resin composition, in which the multilayer structure polymer (B) is dispersed in the resin (A), of the present invention, or orientation of the polymer chains occurs when stress is applied to molded bodies or films. Under a state in which the orientation of these polymer chains occurs, the orientation of the polymer chains of the resin (A) and the orientation of the polymer chains of the multilayer structure polymer (B) take place in the same direction, and at this time the photoelastic constants (also orientation birefringence as needed) of both the polymer chains are opposite in sign, and therefore it is thought that molded bodies and films having low birefringence and high optical isotropy are obtained.

The multilayer structure polymer (B) having a photoelastic constant (and orientation birefringence if necessary) which is opposite in sign to that of the resin (A) is capable of freely designing layers showing mainly photoelastic constants (and orientation birefringence if necessary) which are different in signs. For example, either one or both of a crosslinked polymer layer and a hard polymer layer of the multilayer structure polymer (B) may be designed without any particular limitation of such layers.

When a crosslinked polymer layer of the multilayer structure polymer (B) is a layer which is opposite in sign of a photoelastic constant (and orientation birefringence if necessary) to that of the resin (A), the crosslinked polymer layer is hardly deformed by external force by the crosslinked structure, the orientation of the polymer chains is unlikely to occur, and the effect to offset the photoelastic constant (and orientation birefringence if necessary) of the resin (A) will tend to be less effective. In addition, when setting the crosslinking density of the crosslinked polymer layers of the multilayer structure polymer (B) to a low value, the polymer is easily deformed by external force, and thereby the effect of offsetting the photoelastic constant (and orientation birefringence if necessary) of the resin (A) is increased.

Therefore, by allowing the hard polymer layer of the multilayer structure polymer (B) to include a layer having a photoelastic constant (and orientation birefringence if necessary) that is opposite in sign to that of the resin (A), the orientation of the polymer chains of the resin (A) and the orientation of the polymer chains of the hard polymer layer of the multilayer structure polymer (B) are likely to occur in the same direction, which is effective. Preferred is a hard polymer layer having no crosslinked structure, and the hard polymer layer is more preferably an outer layer of the multilayer structure polymer (B), so that an interaction with the resin (A) easily occurs.

A particularly preferred aspect is that hard polymer layers have at least two different hard polymer layers, wherein at least one layer of such hard polymer layers is a layer having a photoelastic constant (and orientation birefringence if necessary) that is opposite in sign to that of the resin (A) and at least one other layer is a layer that is well compatible with the resin (A). The at least one other layer is a layer whose photoelastic constant (and orientation birefringence if necessary) is the same or opposite in sign to that of the resin (A).

In the present application, a graft ratio is used as a parameter to express the degree of covalent bonding of the hard polymer layer to the crosslinked polymer layer in the multilayer structure polymer (B).

The graft ratio of the multilayer structure polymer (B) is an index representing the weight ratio of the grafted hard polymer layer to the crosslinked polymer layer when the weight of the crosslinked polymer layer is regarded as 100. The graft ratio is preferably 10 to 250%, more preferably 40 to 230%, most preferably 60 to 220%. If the graft ratio is less than 10%, the multilayer structure polymer (B) is likely to aggregate in a resulting molded body so that the transparency may be impaired or defects are caused by foreign substances. Further, the tensile elongation at break of the film is reduced so that crack is likely to occur when the film is cut. If the graft ratio is 250% or more, the melt viscosity during molding, for example, during film formation increases, resulting in a tendency to deteriorate film formability. The calculation formula of the graft ratio will be described later in the section of Examples.

2.1 Hard Polymer Layer (C) Whose Photoelastic Constant is Opposite in Sign to that of Resin (A)

Monomer species that are used for forming the hard polymer layer (C) of the multilayer structure polymer (B) and are suitable for cancelling out the photoelastic birefringence of the resin (A) shall be selected so that the photoelastic constant of the resin (A) and the photoelastic constant of the hard polymer layer (C) are opposite in sign to each other.

Specific examples of a monomer are given below as a reference for setting the photoelastic constant of a polymer, but the monomer species are not limited thereto (a value in the parenthesis [ ] represents the photoelastic constant of its homopolymer).

Monomers showing positive photoelastic birefringence:
Benzyl methacrylate[$48.4 \times 10^{-12}$ $Pa^{-1}$]
Dicyclopentanyl methacrylate[$6.7 \times 10^{-12}$ $Pa^{-1}$]
Styrene[$10.1 \times 10^{-12}$ $Pa^{-1}$]
p-Chlorostyrene[$29.0 \times 10^{-12}$ $Pa^{-1}$]
Monomers showing negative photoelastic birefringence:
Methyl methacrylate[$4.3 \times 10^{-12}$ $Pa^{-1}$]
2,2,2-Trifluoroethyl methacrylate [$-1.7 \times 10^{-12}$ $Pa^{-1}$]
2,2,2-Trichloroethyl methacrylate [$-10.2 \times 10^{-12}$ $Pa^{-1}$]
Isobornyl methacrylate [$-5.8 \times 10^{-12}$ $Pa^{-1}$]

It is known that additivity is established between the photoelastic constant of a copolymer and the photoelastic constants of homopolymers corresponding to monomer species used for copolymerization. For example, it has been reported that in the case of a binary copolymerization system of methyl methacrylate (MMA) and benzyl methacrylate (BzMA), its photoelastic birefringence is substantially zero when the ratio of poly-MMA/BzMA is 92/8 (wt %). The same applies to a mixture (alloy) of two or more polymers, that is, additivity is established between the photoelastic constant of a polymer mixture and the photoelastic constant of each polymer. This is why it is necessary to allow the photoelastic constants of the resin (A) and the hard polymer layer (C) to be opposite in sign and to adjust the amounts (wt %) of the resin (A) and the hard polymer layer (C) to be blended to reduce the photoelastic birefringences of the resin composition and the film of the present invention.

Further, it is known that additivity is established between the orientation birefringence of a copolymer and the intrinsic birefringence of each homopolymer corresponding to monomer species used for copolymerization. The same applies to a mixture (alloy) of two or more polymers, that is, additivity is established between the orientation birefringence of a polymer mixture and the intrinsic birefringence of each polymer. The monomer species that are used for forming the hard polymer layer (C) of the multilayer structure polymer (B) and are suitable for cancelling out the orientation birefringence of the resin (A) shall be selected so that the orientation birefringence of the resin (A) and the orientation birefringence of the hard polymer layer (C) are opposite in sign. Specific examples of a monomer are given below as a reference for setting the orientation birefringence of a polymer (a value in the parenthesis [ ] represents the intrinsic birefringence of a homopolymer consisting of the monomer), but the monomer species are not limited thereto. It is to be noted that the term "intrinsic birefringence" refers to birefringence (orientation birefringence) when a polymer is completely oriented in one direction.

Polymers showing positive intrinsic birefringence:
Poly(benzyl methacrylate) [+0.002]
Polyphenylene oxide [+0.210]
Bisphenol A polycarbonate [+0.106]
Polyvinyl chloride [+0.027]
Polyethylene terephthalate [+0.105]
Polyethylene [+0.044]
Polymers showing negative intrinsic birefringence:
Poly(methyl methacrylate) [−0.0043]
Polystyrene [−0.100]

Although the data of photoelastic constants and orientation birefringences of some polymers are shown above, both the birefringences are not always the same in sign depending on the type of polymer. That is, some polymers have a "positive" orientation birefringence and a "negative" photoelastic constant. The signs of the orientation birefringence and photoelastic birefringence (constant) of some homopolymers are shown in the following Table 1 as examples.

TABLE 1

| Homopolymer | Sign of orientation birefringence | Sign of photoelastic constant |
|---|---|---|
| Poly(methyl methacrylate) (MMA) | Negative | Negative |
| Poly(2,2,2-trifluoroethyl methacrylate) (3FMA) | Positive | Negative |
| Poly(benzyl methacrylate) (BzMA) | Positive | Positive |

For example, it is known that the orientation birefringence of a poly(MMA/BzMA) copolymer having a composition of around 82/18 (wt %) is substantially zero and that the photoelastic birefringence (constant) of a poly(MMA/BzMA) copolymer having a composition of around 92/8 (wt %) is substantially zero. As shown above, when the resin (A) is an acrylic resin, both the orientation birefringence and the photoelastic constant thereof are often negative, and therefore benzyl methacrylate whose orientation birefringence and photoelastic birefringence are both positive is suitable for use in the hard polymer layer (C) of the multilayer structure polymer (B) because the orientation birefringence of the resin (A) can be cancelled out while the photoelastic birefringence of the resin (A) is also cancelled out.

The hard polymer layer (C) may be designed by appropriately selecting a monomer as long as its composition is the composition of a crosslinked polymer having a photoelastic constant that is opposite in sign to that of the resin (A). However, from the viewpoint of excellent optical isotropy, preferred examples of the monomer that is particularly suitable for use include vinyl-based monomers having a ring structure such as an alicyclic structure, a heterocyclic structure, or an aromatic group in their molecular structure. Among them, a vinyl-based monomer having an alicyclic structure, a heterocyclic structure, or an aromatic group is more preferably contained as a structural unit. Specific examples of the vinyl-based monomer having an alicyclic structure, a heterocyclic structure, or an aromatic group include a monomer having an alicyclic structure, such as dicyclopentanyl (meth)acrylate and dicyclopentenyloxyethyl (meth)acrylate. In addition, examples of the monomer having an aromatic group include vinyl arenes (e.g. styrene, α-methylstyrene, monochlorostyrene, and dichlorostyrene), benzyl (meth)acrylate, phenyl (meth)acrylate, and phenoxyethyl (meth)acrylate. Examples of the monomer having a heterocyclic structure include pentamethylpiperidinyl (meth)acrylate, tetramethylpiperidinyl (meth)acrylate, and tetrahydrofurfuryl (meth)acrylate. In the vinyl-based monomer having an alicyclic structure, the ring structure is preferably a polycyclic structure, and more preferably a fused ring structure.

The vinyl-based monomer having an alicyclic structure, a heterocyclic structure, or an aromatic group is preferably a monomer represented by the following formula (4):

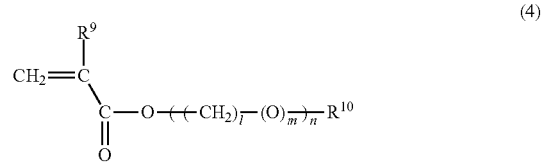

wherein $R^9$ is a hydrogen atom or a substituted or unsubstituted linear or branched alkyl group having 1 to 12 carbon atoms; and $R^{10}$ is a substituted or unsubstituted aromatic group having 1 to 24 carbon atoms, or a substituted or unsubstituted alicyclic group having 1 to 24 carbon atoms, and has a monocyclic structure or a heterocyclic structure. The substituent optionally possessed by $R^9$ and $R^{10}$ is, for example, at least one member selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Among them, at least one member selected from the group consisting of a halogen, a hydroxyl group, a carboxyl group, an alkoxy group, and a nitro group is preferred. In the formula (4), l is an integer of 1 to 4, preferably 1 or 2, m is an integer of 0 to 1, and n is an integer of 0 to 10, preferably 0 to 2, more preferably 0 or 1.

The vinyl-based monomer having an alicyclic structure, a heterocyclic structure, or an aromatic group is preferably a (meth)acrylate monomer having an alicyclic structure, a heterocyclic structure, or an aromatic group. More specifically, the vinyl-based monomer is more preferably a (meth)acrylate monomer represented by the formula (4) wherein $R^9$ is a hydrogen atom or a substituted or unsubstituted linear or branched alkyl group having 1 carbon atom.

In the formula (4), $R^{10}$ is a substituted or unsubstituted aromatic group having 1 to 24 carbon atoms or a substituted or unsubstituted alicyclic group having 1 to 24 carbon atoms, and is more preferably a (meth)acrylate monomer having a monocyclic structure.

Among (meth)acrylate monomers represented by the formula (4), benzyl (meth)acrylate, dicyclopentanyl (meth)acrylate, and phenoxyethyl (meth)acrylate are preferred.

Among the (meth)acrylate monomers having an aromatic group represented by the formula (4), benzyl (meth)acrylate is most preferred in terms of optical isotropy, compatibility with the resin (A), and moldability. For example, when the resin (A) is an acrylic resin, the resin (A) has a negative photoelastic constant, and therefore the use of benzyl methacrylate having a relatively large positive photoelastic constant has benefits that the amount of benzyl methacrylate to be used can be reduced or the amount of the multilayer structure polymer (B) to be used can be reduced, and that the degree of freedom of design of the resin composition can be increased. Although there is a case where high orientation birefringence of a molded body causes a problem when the molded body is practically used, the orientation birefringence and photoelastic birefringence of benzyl methacrylate are both positive whereas the orientation birefringence and photoelastic birefringence of an acrylic resin are both negative. Therefore, the orientation birefringence of the optical resin material or the film can be reduced while the photoelastic birefringence of the optical resin material or the film is also reduced.

In the present invention, either one of benzyl methacrylate and benzyl acrylate can be preferably used, and these monomers may be used singly or in combination. When used in applications requiring higher heat resistance, benzyl methacrylate is more preferably used from the viewpoint of glass transition temperature.

From the viewpoint of achieving excellent dispersibility of the multilayer structure polymer (B) to reduce appearance defects such as fish eyes while maintaining excellent optical isotropy, the hard polymer layer (C) is preferably one obtained by polymerization of a monomer mixture (c) containing 1 to 100 wt % of a vinyl-based monomer having an alicyclic structure, a heterocyclic structure, or an aromatic group, 99 to 0 wt % of a monomer copolymerizable therewith, and 0 to 2.0 parts by weight of a polyfunctional monomer with respect to 100 parts by weight of the total amount of the monofunctional monomer. The polymer mixture (c) may be polymerized in one stage after mixing all the monomers or in two or more stages while changing the composition of monomers.

As an example of the monomer copolymerizable with the vinyl-based monomer having an alicyclic structure, a heterocyclic structure, or an aromatic group, alkyl methacrylates can be mentioned. From the viewpoint of polymerizability or cost, the alkyl methacrylate is preferably one whose alkyl group has 1 to 12 carbon atoms, and the alkyl group may be either linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, alkyl acrylates may also be preferably used. From the viewpoint of polymerization reactivity or cost, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Other examples of the copolymerizable monomer include: unsubstituted and/or substituted maleic anhydrides such as maleic anhydride, citraconic anhydride, dimethyl maleic anhydride, dichloromaleic anhydride, bromomaleic anhydride, dibromomaleic anhydride, phenylmaleic anhydride, and diphenylmaleic anhydride; acrylamides such as an acrylamide and N-methylolacrylamide; methacrylamides such as methacrylamide; vinyl halides such as vinyl chloride and vinyl bromide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and hydroxyalkyl acrylates such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Among them, alkyl methacrylates and alkyl acrylates are preferred. Further, when the resin (A) is an acrylic resin, methyl methacrylate is preferably used from the viewpoint of compatibility with the acrylic resin (A), and methyl acrylate, ethyl acrylate, or n-butyl acrylate is preferably used from the viewpoint of suppressing zipper depolymerization. As a polyfunctional monomer, the polyfunctional monomers usable in the crosslinked polymer layer described above can be used as well. From the viewpoint of dispersibility of the multilayer structure polymer (B) in the resin (A) and optical isotropy, the amount used of the polyfunctional monomer is preferably 0 to 2.0 parts by weight, more preferably 0 to 1.0 part by weight, even more preferably 0 to 0.5 part by weight, still more preferably 0 to 0.04 part by weight, with respect to 100 parts by weight of the total amount of the monofunctional monomer, and it is most preferable not to use the polyfunctional monomer for the hard polymer layer (C).

The amount used of the vinyl-based monomer having an alicyclic structure, a heterocyclic structure, or an aromatic group is preferably 1 to 100 wt %, more preferably 5 to 70 wt %, most preferably 5 to 50 wt %, with respect to 100 wt % of the total amount of the vinyl-based monomer having an alicyclic structure, a heterocyclic structure, or an aromatic group and a monomer copolymerizable therewith.

The multilayer structure polymer (B) may have at least one hard polymer layer (C), or may have two or more hard polymer layers (C).

2.2 Hard Polymer Layer (D)

The multilayer structure polymer (B) has, as a hard polymer layer, at least one other hard polymer layer (D) different from a hard polymer layer having a photoelastic constant that is opposite in sign to that of the resin (A). The hard polymer layer (D) is not particularly limited, but the hard polymer layer (D) is preferably obtained by appropriately selecting a monomer and polymerizing the monomer to form a polymer that is easily compatible with the resin (A), and thereby achieves the effect of enhancing the dispersibility of the multilayer structure polymer (B) in the resin (A). Generally, in order to match the compatibility, there are known methods including a method of matching the solubility parameter (SP value) of the hard polymer layer (D) with that of the resin to be blended, a method of matching the melt viscosity of the hard polymer layer (D) with that of the resin, a method of reacting the hard polymer layer (D) having a reactive group with the resin having a reactive group at the time of melt extrusion, and a method of allowing each of the hard polymer layer (D) and the resin to have a withdrawing functional group. If compatibility is ensured with respect to the selected resin (A) by a suitable method and the multilayer structure polymer (B) can be dispersed in the resin (A), there is no particular limitation on the composition of the hard polymer layer (D). It is particularly preferable that the hard polymer layer (D) is formed of the same monomer and the same composition as those of the resin (A). Thus, the monomer that can be used is not particularly limited, and monomers that are mentioned in the hard polymer layer (C) may be appropriately used. For example, when the resin (A) is an acrylic resin, the hard polymer layer (D) is preferably a (meth)acrylic hard polymer layer; a hard polymer layer having a backbone such as acrylic acid or methacrylic acid; a hard polymer layer having a backbone of an unsubstituted and/or substituted maleic anhydride such as maleic anhydride, citraconic anhydride, dimethylmaleic anhydride, dichloromaleic anhydride, bromomaleic anhydride, dibromomaleic anhydride, phenylmaleic anhydride, and diphenylmaleic anhydride; or a hard polymer layer having a backbone of vinyl cyanide such as acrylonitrile and methacrylonitrile. As the (meth)acrylic hard polymer, those obtained by polymerization of a monomer mixture (d) containing an alkyl (meth)acrylate are more preferred. The hard polymer layer having a backbone of vinyl cyanide is more preferably an acrylonitrile-styrene-based hard polymer layer. The monomer mixture (d) is preferably composed of 1 to 100 wt % of an alkyl (meth)acrylate, 99 to 0 wt % of a monomer copolymerizable therewith, and 0 to 2.0 parts by weight of a polyfunctional monomer with respect to 100 parts by weight of the total amount of the monofunctional monomer. Monomers same as those described above can be used as the copolymerizable monomer.

Among the alkyl (meth)acrylates, an alkyl methacrylate is preferred, and methyl methacrylate is more preferred. The amount used of methyl methacrylate is preferably 1 to 100 wt %, more preferably 5 to 99 wt %, most preferably 10 to 95 wt %, with respect to 100 wt % of the total amount of the methyl methacrylate and a monomer copolymerizable therewith. If the object of the present invention is achieved, the hard polymer layer (D) may consist of only methyl methacrylate. As the monomer copolymerizable with methyl methacrylate, an alkyl acrylate is particularly preferred because the acrylic resin obtained by copolymerization of the alkyl acrylate tends to be excellent in thermal decomposition resistance and flowability during molding. Here, the thermal decomposition resistance means the difficulty of the decomposition of the acrylic resin at high temperatures. The amount used of the alkyl acrylate in the case of copolymerizing an alkyl acrylate with methyl methacrylate is preferably 0.1 wt % or more with respect to the total monomer mixture from the viewpoint of thermal decomposition resistance, and is preferably 15 wt % or less from the viewpoint of heat resistance. The amount used of the alkyl acrylate in such a case is more preferably 0.2 wt % or more and 14 wt % or less, even more preferably 1 wt % or more and 12 wt % or less. Among the alkyl acrylates, methyl acrylate and ethyl acrylate are preferred because their copolymerized product with a small amount of methyl methacrylate gives an effect of significantly improving the flowability during the above-mentioned molding. As the polyfunctional monomer, it is possible to similarly use the polyfunctional monomer used in the above-mentioned crosslinked polymer layer, and the amount used is preferably 0 to 2.0 parts by weight, more preferably 0 to 1.0 part by weight, even more preferably 0 to 0.5 part by weight, still more preferably 0 to 0.04 part by weight, with respect to 100 parts by weight of the total amount of the monofunctional monomer from the viewpoint of dispersibility in the resin (A), optically isotropy, and mechanical strength. In particular, it is most preferable not to use the polyfunctional monomer in view of the dispersibility of the multilayer structure polymer (B) in the resin (A) and optical isotropy.

The multilayer structure polymer may have at least one hard polymer layer (D) or may have two or more hard polymer layers (D).

The multilayer structure polymer (B) is not particularly limited as long as it has a hard polymer layer (C) and a hard polymer layer (D) in the multilayer structure, and preferably has a hard polymer layer (C) and a hard polymer layer (D) as the hard outer layer. In addition, it is preferable to have either a hard polymer layer (C) or a hard polymer layer (D) as the outermost layer. By allowing the multilayer structure polymer (B) to have a hard outermost layer, it is possible to allow the polymer (B) to be more easily compatible with the acrylic resin (A), further reduce orientation birefringence and photoelastic constant, and easily obtain a film having excellent optical isotropy. Furthermore, although either of a hard polymer layer (C) and a hard polymer layer (D) as the outermost layer can exhibit the effect of the present invention, it is most preferable that the hard polymer layer (D) is the outermost layer because excellent transparency is obtained even after the stretching.

A (meth)acrylic crosslinked polymer layer may be adjacent to the inner side of the hard polymer layer (C) and/or the hard polymer layer (D) in the multilayer structure polymer (B).

The multilayer structure polymer (B) is not particularly limited as long as it is a multilayer structure polymer having at least one crosslinked polymer layer, at least one hard polymer layer (C), and at least one hard polymer layer (D). A preferred example of the form of such a multilayer structure polymer (B) is one that has a soft inner layer having a (meth)acrylic crosslinked polymer layer and a hard outer layer having a hard polymer layer (C) and a hard polymer layer (D). This structure is preferred from the viewpoint of productivity. Another preferred example of the form of the multilayer structure polymer (B) is one that has a hard inner layer composed of at least one hard polymer layer, a soft intermediate layer having a (meth)acrylic crosslinked polymer layer, and a hard outer layer having a hard polymer layer (C) and a hard polymer layer (D), and this multilayer structure may further have a soft innermost layer.

In the present invention, one or more kinds of the multilayer structure polymers (B) can be appropriately used singly or in combination.

In the present application, the terms "soft inner layer," "soft intermediate layer," and "soft innermost layer" (hereinafter, referred to as "soft layers") refer to an inner layer, an intermediate layer, and an innermost layer composed of at least one kind of soft polymer, respectively.

On the other hand, in the present application, the terms "hard outer(most) layer" and "hard inner layer" refer to an outer(most) layer and an inner layer composed of at least one kind of hard polymer, respectively.

When the multilayer structure polymer (B) has a hard layer as an innermost layer, for example, when the multilayer structure polymer (B) has a multilayer structure composed of a hard inner layer, a soft intermediate layer, and a hard outer layer, the innermost layer is preferably made of, for example, a hard polymer composed of 40 to 100 wt % of a methacrylate, 0 to 60 wt % of an acrylate, 0 to 60 wt % of an aromatic vinyl monomer, 0 to 10 wt % of a polyfunctional monomer, and 0 to 20 wt % of a vinyl monomer copolymerizable with the methacrylate, the acrylate, and the aromatic vinyl monomer from the viewpoint of a balance between hardness and crack resistance.

When the multilayer structure polymer (B) has a multilayer structure composed of, for example, a soft inner layer having a (meth)acrylic crosslinked polymer layer and a hard outer layer having a hard polymer layer (C) and a hard polymer layer (D), a layer structure, in which the soft inner layer is completely covered with the outer hard polymer layer, is generally formed. However, depending on, for example, the weight ratio between the soft inner layer and the hard outer layer, there is a case where the amount of the hard polymer is not sufficient for forming such a layer structure. In such a case, the layer structure does not always need to be complete, and a structure in which part of the soft inner layer is covered with the hard polymer as an outer part or a structure in which the hard polymer as an outer part is graft-polymerized with part of the soft inner layer may also be included in the multilayer structure polymer (B) of the present invention. It is to be noted that the same applies to other forms of the multilayer structure.

The volume average particle diameter to the crosslinked polymer layer of the multilayer structure polymer (B) is preferably 20 to 450 nm, more preferably 20 to 300 nm, even more preferably 20 to 150 nm, most preferably 30 to 80 nm. If the volume average particle diameter is less than 20 nm, there is a case where crack resistance is deteriorated. On the other hand, if the volume average particle diameter exceeds 450 nm, there is a case where transparency is deteriorated. Further, from the viewpoint of resistance to whitening on bending, the volume average particle diameter is preferably less than 80 nm. In addition, from the viewpoint of trimming property, the volume average particle diameter is preferably 20 to 450 nm, more preferably 50 to 450 nm, even more preferably 60 to 450 nm, still more preferably 100 to 450 nm. It is to be noted that the volume average particle diameter can be measured by a dynamic scattering method using, for example, MICROTRAC UPA150 (manufactured by NIKKISO CO., LTD.). Here, the volume average particle diameter of the multilayer structure polymer (B) to the crosslinked polymer layer refers to a volume average particle diameter of particles from the center of the multilayer structure polymer (B) particles to the crosslinked polymer layer. More specifically, when the multilayer structure polymer (B) has a (meth)acrylic crosslinked polymer layer as the inner layer and a hard polymer layer as the outer layer, the average volume particle diameter of the multilayer structure polymer (B) to the crosslinked polymer layer refers to a volume average particle diameter of particles from the center of the multilayer structure polymer (B) particles to the (meth)acrylic crosslinked polymer layer. When the multilayer structure polymer (B) has two or more crosslinked polymer layers, the average volume particle diameter of the multilayer structure polymer (B) to the crosslinked polymer layer refers to a volume average particle diameter to the crosslinked polymer layer farthest from the center of the multilayer structure polymer (B) particles.

The crosslinked polymer content of the multilayer structure polymer (B) is preferably 10 to 90 wt %, more preferably 20 to 80 wt %, even more preferably 30 to 60 wt %, most preferably 35 to 55 wt % when the amount of the multilayer structure polymer (B) is taken as 100 wt %. If the crosslinked polymer content is less than 10 wt %, there is a case where a resulting resin composition has low mechanical strength such as crack resistance. On the other hand, if the crosslinked polymer content exceeds 90 wt %, the dispersibility of the multilayer structure polymer (B) is impaired and a resulting molded body cannot have a smooth surface, which tends to cause appearance defects such as fish eyes. Further, the hard polymer content is not sufficient, which tends to increase orientation birefringence or photoelastic constant so that optical isotropy cannot be maintained.

The method for producing the multilayer structure polymer (B) is not particularly limited, and a known emulsion polymerization method, emulsion-suspension polymerization method, suspension polymerization method, bulk polymerization method, or solution polymerization method can be used. However, the multilayer structure polymer (B) is particularly preferably produced by an emulsion polymerization method.

The multilayer structure polymer (B) is obtained by multistage polymerization. In the multistage polymerization, the multilayer structure polymer (B) is obtained by performing at least polymerization of a monomer mixture (c) containing a (meth)acrylate monomer having an alicyclic structure, a heterocyclic structure, or an aromatic group and a monomer copolymerizable therewith in the presence of (meth)acrylic rubber-containing polymer particles, and polymerization of a monomer mixture (d) containing an alkyl (meth)acrylate and a monomer copolymerizable therewith. The (meth)acrylic rubber-containing graft copolymer obtained by such multistage polymerization can be preferably used.

The content of the (meth)acrylate monomer having an alicyclic structure, a heterocyclic structure, or an aromatic group is preferably 1 to 100 wt %, more preferably 5 to 70 wt %, most preferably 5 to 50 wt % with respect to 100 wt % of the total amount of the (meth)acrylate monomer having an alicyclic structure, a heterocyclic structure, or an aromatic group and the monomer copolymerizable therewith. By this polymerization of the monomer mixtures, a hard polymer layer having, as a structural unit, the (meth)acrylate monomer having an alicyclic structure, a heterocyclic structure, or an aromatic group is formed. Examples of the monomer copolymerizable with the (meth)acrylate monomer having an alicyclic structure, a heterocyclic structure, or an aromatic group are the same as those used for the hard polymer layer (C), and these monomers can also be preferably used. Further, a polyfunctional monomer may be contained in the monomer mixture. Examples of the polyfunctional monomer are the same as those used for the crosslinked polymer layer, and the amount used is 0 to 2.0 parts by weight, more preferably 0 to 1.0 part by weight or less, even more preferably 0 to 0.5 part by weight, still more preferably 0 to 0.04 part by weight, with respect to 100 parts by weight of the total amount of the monofunctional monomer, and it is particularly preferable not to contain the polyfunctional monomer. The same applies to the preferable content when benzyl (meth)acrylate is used as a (meth)acrylate monomer having an aromatic group.

The (meth)acrylic rubber-containing polymer particles shall be polymer particles obtained by multistage polymerization and containing at least a (meth)acrylic rubber. The (meth)acrylic rubber-containing polymer particles preferably have a rubber ((meth)acrylic crosslinked polymer) part obtained by polymerization of 50 to 100 wt % of an alkyl acrylate, 50 to 0 wt % of a vinyl monomer copolymerizable with the alkyl acrylate, and 0.05 to 10 parts by weight of a polyfunctional monomer (with respect to 100 parts by weight of the total amount of the alkyl acrylate and the vinyl monomer copolymerizable therewith). The rubber part may be obtained by one stage polymerization performed by mixing all the monomer components or by polymerization performed in two or more stages by changing the composition of monomers.

The (meth)acrylic rubber-containing polymer particles are not particularly limited as long as a (meth)acrylic crosslinked polymer (rubber part) is formed in at least one of the stages of multistage polymerization, and polymerization for forming a hard polymer may be performed before and/or after the stage of polymerization for forming a (meth)acrylic crosslinked polymer.

Particularly, from the viewpoint of productivity, the multilayer structure polymer (B) to be used is preferably a (meth)acrylic rubber-containing graft copolymer obtained by:

(b-1) polymerization of a monomer mixture containing 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith) to give (meth)acrylic rubber-containing polymer particles, (b-2) polymerization of a monomer mixture containing 1 to 100 wt % of a vinyl-based monomer having an alicyclic structure, a heterocyclic structure, or an aromatic group (preferably a (meth)acrylate monomer having a cyclic structure, a heterocyclic structure, or an aromatic group), 99 to 0 wt % of a monomer copolymerizable therewith, and 0 to 2.0 parts by weight of a polyfunctional monomer (with respect to 100 parts by weight of the total amount of the vinyl-based monomer having an alicyclic structure, a heterocyclic structure, or an aromatic group and the monomer copolymerizable therewith) in the presence of the (meth)acrylic rubber-containing polymer particles to give a polymer (C), and (b-3) polymerization of a monomer mixture containing 1 to 100 wt % of an alkyl (meth)acrylate, 99 to 0 wt % of a monomer copolymerizable therewith, and 0 to 2.0 parts by weight of a polyfunctional monomer (with respect to 100 parts by weight of the total amount of the alkyl (meth)acrylate and the monomer copolymerizable therewith) in the presence of the polymer obtained in (b-2) to give a polymer (D).

Here, the polymerization of the monomer mixture in the stage (b-1) and/or the polymerization of the monomer mixture in the stage (b-2) and/or (b-3) may be performed in one stage by mixing all the monomer components or in two or more stages by changing the composition of monomers. Further, examples of the alkyl acrylate, the monomer copolymerizable therewith, the polyfunctional monomer, and preferred amounts thereof to be used in the stage (b-1) are the same as those described above with reference to the (meth)acrylic crosslinked polymer.

It is to be noted that a polymer which is not bound (not grafted) to the crosslinked polymer layer of the multilayer structure polymer (B) (also referred to as free polymer) is present in a portion of the polymer for forming a hard polymer layer (C) and/or a portion of the polymer for forming a hard polymer layer (D). However, the free polymer shall also be included in the multilayer structure polymer (B).

When the multilayer structure polymer (B) is produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctylsulfosuccinate, sodium lauryl sulfate, fatty acid sodium, and phosphate salts such as sodium polyoxyethylene lauryl ether phosphate and non-ionic surfactants such as reaction products of alkyl phenols or aliphatic alcohols with propylene oxide or ethylene oxide. These surfactants may be used singly or in combination of two or more of them. Further, if necessary, a cationic surfactant such as an alkylamine salt may be used. Among them, a phosphate salt (an alkali metal salt or an alkaline earth metal salt) such as sodium polyoxyethylene lauryl ether phosphate is particularly preferably used for polymerization from the viewpoint of improving the heat stability of a resulting multilayer structure polymer (B).

A multilayer structure polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to give a powdered multilayer structure polymer. When the polymer latex is coagulated to give a multilayer structure polymer, a known coagulant such as an acid or a salt can be used, but a magnesium salt, especially magnesium sulfate, is particularly preferably used as a coagulant from the viewpoint of improving heat stability during molding of a resulting copolymer.

The multilayer structure polymer (B) is preferably blended so that the content of the crosslinked polymer layer (for example, the content of the (meth)acrylic crosslinked polymer when the crosslinked polymer layer is a (meth)acrylic crosslinked polymer layer) is 1 to 60 parts by weight, more preferably 1 to 30 parts by weight, even more preferably 1 to 25 parts by weight, with respect to 100 parts by weight of the resin composition. If the content of the crosslinked polymer layer is less than 1 part by weight, there is a case where the crack resistance or vacuum moldability of the film is deteriorated or the film has poor optical isotropy due to an increase in photoelastic constant. On the other hand, if the content of the crosslinked polymer layer exceeds 60 parts by weight, the heat resistance, surface hardness, transparency, or resistance to whitening on bending of the film tends to be deteriorated.

The ratio between the resin (A) and the multilayer structure polymer (B) to be blended is not particularly limited as long as the above-mentioned requirement for blending is satisfied. Depending on the amount of the crosslinked polymer contained in the multilayer structure polymer (B), the amount of the multilayer structure polymer (B) to be blended is preferably 1 to 99 wt %, more preferably 1 to 80 wt %, even more preferably 1 to 60 wt % when the total amount of the resin (A) and the multilayer structure polymer (B) is taken as 100 wt %. If the amount of the multilayer structure polymer (B) to be blended is less than 1 wt %, there is a case where the crack resistance or vacuum moldability of the film is deteriorated or the film has poor optical isotropy due to an increase in photoelastic constant. On the other hand, if the amount of the multilayer structure polymer (B) to be blended exceeds 99 wt %, the heat resistance, surface hardness, transparency, or resistance to whitening on bending of the film tends to be deteriorated.

If necessary, the resin composition of the present invention may be blended with birefringent inorganic microparticles described in Japanese Patent No. 3648201 or Japanese Patent No. 4336586 or a birefringent low molecular compound having a molecular weight of 5000 or less, preferably 1000 or less described in Japanese Patent No. 3696649 to adjust orientation birefringence.

The resin composition of the present invention preferably has a photoelastic constant of $-4\times10^{-12}$ to $4\times10^{-12}$ $Pa^{-1}$, more preferably $-2\times10^{-12}$ to $2\times10^{-12}$ $Pa^{-1}$, even more preferably $-1\times10^{-12}$ to $1\times10^{-12}$ $Pa^{-1}$, most preferably $-0.5\times10^{-12}$ to $0.5\times10^{-12}$. When the photoelastic constant of the resin composition is within the above range, the molded body exhibits only small birefringence even when stress is applied thereto in an environment of, for example, high temperature and high humidity, and therefore can be practically used without problem.

The orientation birefringence of the resin composition of the present invention is preferably $-1.7\times10^{-4}$ to $1.7\times10^{-4}$, more preferably $-1.6\times10^{-4}$ to $1.6\times10^{-4}$, even more preferably $-1.5\times10^{-4}$ to $1.5\times10^{-4}$, still more preferably $-1\times10^{-4}$ to $1\times10^{-4}$, particularly preferably $-0.5\times10^{-4}$ to $0.5\times10^{-4}$, most preferably $-0.2\times10^{-12}$ $Pa^{-1}$ to $0.2\times10^{-12}$ $Pa^{-1}$ or less. When the orientation birefringence of the resin composition is within the above range, the resin composition does not exhibit birefringence resulting from molding processing and therefore can have stable optical characteristics. Further, the molded article is very suitable as an optical film for use in liquid crystal displays and the like.

The t resin composition of the present invention shall contain at least one resin (A) and at least one multilayer structure polymer (B), and one or more different resins may be added thereto without any particular limitation as long as the object of the present invention can be achieved. Examples of the different resins include the thermoplastic resins mentioned above as examples of the resin (A), multilayer structure polymers such as core-shell polymers and graft copolymers, and thermoplastic elastomers such as block polymers.

If necessary, the resin composition of the present invention may contain a known additive (e.g. light stabilizers, UV absorbers, heat stabilizers, delustrants, light diffusers, colorants, dyes, pigments, antistatic agents, heat reflecting agents, lubricants, plasticizers, UV absorbers, stabilizers, and fillers) or another resin.

The resin composition of the present invention may be subjected to molding, such as extrusion molding, injection molding, compression molding, blow molding, or spinning molding, under heating directly in the form of particles or after pelletization using an extruder to give a molded article having a shape suitable for its intended use. The resin composition of the present invention is particularly useful as a film, and is successfully processed by, for example, a conventional melt extrusion method such as an inflation method or a T-die extrusion method, a calendering method, or a solvent casting method. Among them, a melt extrusion method using no solvents is preferred. The use of a melt extrusion method makes it possible to reduce production cost or loads on the global environment or working environment caused by solvents.

When the resin composition of the present invention is formed into a film, both surfaces of the film may be brought into contact with (sandwiched between) rolls or metal belts, especially rolls or metal belts heated to a temperature around the glass transition temperature of the film, at the same time, if necessary, so that the film having higher surface properties may be obtained. Further, the film may be subjected to lamination molding or may be modified by biaxial stretching depending on its intended use.

The resin composition of the present invention can be formed into a film even under such high-temperature molding conditions that T-die film formation is used without causing contamination of the molding machine due to scattering of a UV absorber or film defects.

Hereinbelow, as one example of a method for producing a molded article made from the resin composition of the present invention, a method for producing a film by melt-extrusion molding of the resin composition of the present invention will be described in detail.

It is to be noted that in the following description, a film formed by melt extrusion is referred to as "melt-extruded film" to differentiate it from a film formed by another method such as solution casting.

When the resin composition of the present invention is formed into a film by melt extrusion, the resin composition of the present invention is first supplied to an extruder and then melted by heating.

The resin composition is preferably predried before supplied to the extruder. By performing such predrying, it is possible to prevent foaming of the resin extruded from the extruder.

The method for predrying is not particularly limited, but for example, a raw material (i.e., the resin composition of the present invention) may be predried by a hot air drier or the like after formed into pellets or the like.

Further, the extruder for molding the non-birefringent resin material of the present invention preferably has one or more devolatilizers for removing volatile matter produced during melting by heating. By providing one or more devolatilizers, it is possible to reduce deterioration of film appearance due to foaming or decomposition/deterioration reaction of the resin.

Moreover, during melt extrusion for molding the non-birefringent resin material of the present invention, an inert gas such as nitrogen or helium is preferably supplied to a cylinder of the extruder together with the resin material. By supplying an inert gas, it is possible to reduce the concentration of oxygen in a system to reduce decomposition caused by oxidation degradation, crosslinking, or degradation of appearance or quality such as yellowing.

Then, the resin composition melted by heating in the extruder is supplied through a gear pump or a filter to a T-die. By using a gear pump at this time, it is possible to improve uniformity of the amount of the resin to be extruded to reduce thickness variation. On the other hand, the use of a filter makes it possible to remove foreign substances in the resin composition to give a film having excellent appearance without defects.

The filter to be used is preferably a stainless steel leaf-disk filter that can remove foreign substances from a melted polymer, and a filter element to be used is preferably of fiber type, powder type, or complex type thereof. The filter can be preferably used for an extruder or the like for use in pelletization or film formation.

Then, the resin composition supplied to the T-die is extruded through the T-die as a sheet-shaped melted resin. The sheet-shaped melted resin is preferably sandwiched between two cooling rolls and then cooled to form a film.

One of the two cooling rolls sandwiching the sheet-shaped melted resin is preferably a rigid metal roll having a smooth surface and the other cooling roll is preferably a flexible roll provided with a metal elastic external cylinder that has a smooth surface and is elastically deformable.

By cooling the sheet-shaped melted resin sandwiched between such rigid metal roll and flexible roll having a metal elastic external cylinder to form a film, it is possible to correct surface microirregularities or die lines to give a film having a smooth surface and a thickness variation of 5 μm or less.

It is to be noted that the term "cooling roll" used in this specification includes the meaning of "touch roll" and "cooling roll."

Even when the above-mentioned rigid metal roll and flexible roll are used, when a film to be formed is thin, there is a case where the surfaces of the cooling rolls come into contact with each other so that the external surfaces of the cooling rolls are damaged or the cooling rolls themselves are broken because both the cooling rolls have a metallic surface.

Therefore, when sandwiched between such two cooling rolls as described above to form a film, the sheet-shaped melted resin is first sandwiched between the two cooling rolls and then cooled to give a film.

A film obtained by molding the resin composition of the present invention (hereinafter, also referred to as a film of the present invention) has very high toughness and excellent flexibility, and therefore does not need to be stretched to improve strength, which increases productivity due to omission of a stretching process and has a cost advantage.

The film of the present invention has high transparency and therefore can have a thickness of 10 μm or more to achieve high strength. The thickness of the film of the present invention is preferably 500 μm or less, more preferably 300 μm or less, even more preferably 200 μm or less. Further, the thickness of the film of the present invention is preferably 10 μm or more, more preferably 30 μm or more, even more preferably 50 μm or more, particularly preferably 100 μm or more.

The film according to the present invention preferably has a tensile elongation at break of 10% or more, more preferably 20% or more, even more preferably 30% or more, still more preferably 40% or more, still furthermore preferably 50% or more, particularly preferably 60% or more, most preferably 90% or more. Further, the tensile elongation at break exhibited by the stretched film obtained by biaxially stretching the film of the present invention twice is preferably 40% or more, more preferably 50% or more, even more preferably 60% or more, still more preferably 90% or more. When having a tensile elongation at break within the above range, the film of the present invention is less likely to be cracked when cut out with a Thomson blade or a cutter blade (trimming property) and is less likely to be broken when rolled up or when the surface thereof is subjected to post-processing such as coating, vapor deposition, sputtering, or bonding to a protective film. Further, the film has high crack resistance against bending, and therefore problems such as cracks do not occur not only when the film is subjected to post-processing but also when the film is practically used as a product. The crack resistance is particularly correlated with tensile elongation at break, and a higher tensile elongation at break means higher crack resistance.

The film of the present invention in an unstretched state preferably has a haze of 2.0% or less, more preferably 1.0% or less, even more preferably 0.8% or less, particularly preferably 0.5% or less. In addition, the film of the present invention in an unstretched state preferably has a total light transmittance of 85% or more, more preferably 88% or more. When the film of the present invention has a total light transmittance within the above range, the transparency of the film is sufficiently high, and therefore the film is suitable for optics applications, decorative applications, interior applications, or vacuum molding applications requiring transparency.

The film of the present invention can maintain high transparency even after stretching. Specifically, a stretched film obtained when the film of the present invention is biaxially stretched twice preferably has a haze of 2.0% or less, more preferably 1.0% or less, still more preferably 0.8% or less, particularly preferably 0.5% or less. The stretched film obtained by biaxially stretching the film of the present invention twice preferably exhibits a total light transmittance of 85% or more, more preferably 88% or more. Since the film of the present invention can have excellent transparency even after stretching, it is suitable for optics applications, decorative applications, interior applications, or vacuum molding applications requiring transparency.

Furthermore, the film according to the present invention does not substantially suffer from orientation birefringence due to stretching, and such a film is optically isotropic. Specifically, the orientation birefringence (orientation birefringence exhibited by the stretched film obtained by stretching the film of the present invention twice (uniaxial stretching)) is preferably $-1.7\times10^{-4}$ to $1.7\times10^{-4}$, more preferably $-1.6\times10^{-4}$ to $1.6\times10^{-4}$, even more preferably $-1.5\times10^{-4}$ to $1.5\times10^{-4}$, still more preferably $-1.0\times10^{-4}$ to $1.0\times10^{-4}$, particularly preferably $-0.5\times10^{-4}$ to $0.5\times10^{-4}$, most preferably $-0.2\times10^{-4}$ to $0.2\times10^{-4}$. If the orientation birefringence is within the above range, it is possible to obtain stable optical characteristics without the occurrence of birefringence during molding. In addition, the film of the present invention is very suitable as an optical film to be used in a liquid crystal display or the like.

The film of the present invention preferably has a photoelastic constant of $-4\times10^{-12}$ $Pa^{-1}$ to $4\times10^{-12}$ $Pa^{-1}$ more preferably $-2\times10^{-12}$ $Pa^{-1}$ to $2\times10^{-12}$ $Pa^{-1}$, even more preferably $-1.5\times10^{-12}$ $Pa^{-1}$ to $1.5\times10^{-12}$ $Pa^{-1}$, still more preferably $-0.5\times10^{-12}$ $Pa^{-1}$ to $0.5\times10^{-12}$ $Pa^{-1}$, most preferably $-0.3\times10^{-12}$ $Pa^{-1}$ to $0.3\times10^{-12}$ $Pa^{-1}$. If the photoelastic constant of the film is within the above range, even if the film and the stretched film of the present invention are used in a liquid crystal display device, they exhibit only small birefringence even when stress is applied to a molded body in an environment of, for example, high temperature and high humidity, and therefore a phase difference variation, a reduction in the contrast of peripheral area of a display screen, and light leakage do not occur.

The film of the present invention preferably has a glass transition temperature of 100° C. or higher, more preferably 115° C. or higher, even more preferably 120° C. or higher, most preferably 124° C. or higher. When having a glass transition temperature within the above range, the film of the present invention can have sufficiently high heat resistance. The film of the present invention also exhibits small shrinkage due to heat during the secondary molding such as vacuum molding or in use at high temperatures.

The film of the present invention achieves the above effects in an unstretched state, and the unstretched film can be utilized as an optical film. However, since the film exhibits excellent optical characteristics such as optical isotropy and high transparency even when stretched, further stretching is preferable. By stretching the film, it is possible to further improve the mechanical strength and thickness accuracy. Moreover, by selecting suitable stretching conditions, a film with small thickness variation can be easily manufactured without substantially causing birefringence and without substantially increasing haze.

When the film of the present invention is stretched, a stretched film (uniaxially stretched film or biaxially stretched film) can be produced by once molding the resin composition of the present invention to form an unstretched film and then subjecting the unstretched film to uniaxial stretching or biaxial stretching. For example, a sheet-shaped melted resin is sandwiched between the above-mentioned two cooling rolls and then cooled to once obtain an unstretched film having a thickness of 150 µm, and then the film is biaxially stretched longitudinally and laterally to have a thickness of 40 µm.

In this specification, for convenience of description, an unstretched film that is obtained by molding the resin composition of the present invention but is not subjected to stretching is referred to as "raw material film."

When stretched, the raw material film may be continuously subjected to stretching immediately after molding or may be subjected to stretching after once stored or transferred after molding.

It is to be noted that when stretched immediately after molding, the raw material film may be stretched in a very short time (in some cases, instantaneously) after molding in a film production process or may be once produced and then stretched after a lapse of time.

When the film of the present invention is stretched, the raw material film shall be kept in a film form good enough to be stretched and does not always need to be in a perfect film state.

A method for stretching the raw material film is not particularly limited, and any conventionally known stretching method may be used. More specifically, the raw material film may be subjected to, for example, lateral stretching using a tenter, longitudinal stretching using a roll, or sequential biaxial stretching in which such lateral stretching and longitudinal stretching are sequentially combined.

Alternatively, the stretching method may be a simultaneous biaxial stretching method in which lateral stretching and longitudinal stretching are simultaneously performed or a method in which longitudinal stretching using a roll is performed and then lateral stretching using a tenter is performed.

When stretched, the raw material film is preferably once preheated to a temperature higher than the stretching temperature by 0.5 to 5° C., preferably 1 to 3° C. and then cooled to the stretching temperature before stretching.

By preheating the raw material film to a temperature within the above range, it is possible to accurately maintain the thickness of the raw material film or to prevent a resulting stretched film from having low thickness accuracy or thickness variation. Further, it is possible to prevent the raw material film from adhering to a roll or sagging under its own weight.

On the other hand, if the preheating temperature of the raw material film is too high, an adverse effect, such as adhesion of the raw material film to a roll or sagging of the raw material film under its own weight tends to occur. Further, if a difference between the preheating temperature and the stretching temperature of the raw material film is small, the raw material film before stretching tends to be difficult to maintain thickness accuracy or a resulting stretched film tends to have large thickness variation or low thickness accuracy.

It is to be noted that, in the case where the film of the present invention is an acrylic resin film, it is difficult to improve thickness accuracy by utilizing a necking phenomenon when the molded raw material film is stretched. Therefore, in the present invention, control of the above-mentioned preheating temperature is important to maintain or improve the thickness accuracy of a resulting film.

The stretching temperature at which the raw material film is stretched is not particularly limited, and may be changed according to mechanical strength, surface properties, and thickness accuracy required of a stretched film to be produced.

In general, when the glass transition temperature of the raw material film determined by a DSC method is defined as Tg, the stretching temperature is preferably in the range of (Tg−30° C.) to (Tg+30° C.), more preferably in the range of (Tg−20° C.) to (Tg+20° C.), and even more preferably in the range of (Tg) to (Tg+20° C.).

When the stretching temperature is within the above range, it is possible to reduce the thickness variation of a resulting stretched film and to improve the mechanical properties of the film such as percentage of elongation, tear propagation strength, and resistance to flexural fatigue. Further, it is possible to prevent the occurrence of problems such as adhesion of the film to a roll.

On the other hand, if the stretching temperature is higher than the above range, a resulting stretched film tends to have large thickness variation or the mechanical properties of the film, such as percentage of elongation, tear propagation strength, and resistance to flexural fatigue, tend not to be sufficiently improved. Further, problems such as adhesion of the film to a roll tend to occur.

If the stretching temperature is lower than the above range, a resulting stretched film tends to have a large haze or, in an extreme case, problems such as the occurrence of tearing or cracks in the film tend to occur during the production process.

When the raw material film is stretched, its stretching ratio is not particularly limited, either, and may be determined according to the mechanical strength, surface properties, and thickness accuracy of a stretched film to be produced. In general, depending on the stretching temperature, the stretching ratio is preferably selected in the range of 1.1 to 3 times, more preferably in the range of 1.3 to 2.5 times, even more preferably in the range of 1.5 to 2.3 times.

When the stretching ratio is within the above range, it is possible to significantly improve the mechanical properties of the film such as percentage of elongation, tear propagation strength, and resistance to flexural fatigue. Therefore, it is possible to produce a stretched film that has a thickness variation of 5 µm or less, exhibits substantially no birefringence, and has a haze of 2.0% or less.

Since the film and the stretched film of the present invention have excellent optical characteristics, the films can be used as an optical film. In this case, when used as a polarizer protective film, the film preferably has low optical anisotropy. Particularly, the optical anisotropy of the film is preferably low not only in its in-plane direction (length and width directions) but also in its thickness direction. In other words, both the in-plane phase difference and the absolute value of the thickness direction phase difference of the film are preferably small. More specifically, the in-plane phase difference is preferably 10 nm or less, more preferably 6 nm or less, even more preferably 5 nm or less, still more preferably 3 nm or less. The absolute value of the thickness direction phase difference is preferably 50 nm or less, more preferably 20 nm or less, even more preferably 10 nm or less, most preferably 5 nm or less. A film having such a phase difference can be preferably used as a polarizer protective film of a polarizing plate in a liquid crystal display device. On the other hand, if a film having an in-plane phase difference exceeding 10 nm or an absolute value of thickness direction phase difference exceeding 50 nm is used as a polarizer protective film of a polarizing plate in a liquid crystal display device, there is a case where a problem such as a reduction in the contrast of the liquid crystal display device occurs.

The in-plane phase difference (Re) and thickness direction phase difference (Rth) can be calculated by the following formulas, respectively. In the case of an ideal film that is completely optically isotropic in three dimensional directions, its in-plane phase difference Re and thickness direction phase difference Rth are both zero.

$$Re=(nx-ny)\times d$$

$$Rth=((nx+ny)/2-nz)\times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively; d represents a film thickness; and nx−ny represents orientation birefringence. It is to be noted that in the case of a melt-extruded film, MD direction corresponds to the X axis, and in the case of a stretched film, the stretching direction corresponds to the X axis.

The thickness of the stretched film of the present invention is not particularly limited, but is preferably 500 μm or less, more preferably 300 μm or less, particularly preferably 200 μm or less. Further, the thickness of the film of the present invention is preferably 10 μm or more, more preferably 30 μm or more, even more preferably 50 μm or more, particularly preferably 100 μm or more. A film having a thickness within the above range is advantageous in that the film is less likely to be deformed when subjected to vacuum molding and therefore a deep-drawn portion is less likely to be broken, and can have uniform optical characteristics and excellent transparency. On the other hand, if the thickness of the film exceeds the above range, the film after molding is non-uniformly cooled and therefore tends to have non-uniform optical characteristics. If the thickness of the film is less than the above range, there is a case where the film is difficult to handle.

If necessary, the surface gloss of the film and the stretched film of the present invention may be reduced by a known method. This can be achieved by, for example, kneading an inorganic filler or crosslinked polymer particles with the resin composition. Alternatively, a film obtained from the resin composition may be embossed to reduce its surface gloss.

If necessary, the film and the stretched film of the present invention may be used after being laminated to another film with an adhesive or after a coating layer such as a hard coat layer is formed on the surface.

If necessary, the film and the stretched film of the present invention may be subjected to surface treatment. For example, when the film of the present invention is subjected to surface finishing such as coating or another film is laminated on the surface of the film of the present invention, the film is preferably subjected to surface treatment By subjecting the film of the present invention to such surface treatment, it is possible to improve adhesion between the film of the present invention and a coating material or another film to be laminated thereon.

It is to be noted that the purpose of surface treatment of the film and the stretched film of the present invention is not limited to the above purposes. The film and the stretched film of the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

The film and the stretched film of the present invention is excellent in optical characteristics such as optical isotropy and transparency. Therefore, the film and the stretched film of the present invention are particularly suitable for use in known optical applications, such as peripheral materials of liquid crystal display devices such as optically isotropic films, polarizer protective films, and transparent conductive films, taking advantage of its optical characteristics.

The film and the stretched film of the present invention may be bonded to a polarizer to be used as a polarizing plate. That is, the film and the stretched film of the present invention may be used as a polarizer protective film of a polarizing plate. The polarizer is not particularly limited and may be any conventionally known polarizer. A specific example of such a polarizer is iodine-doped stretched polyvinyl alcohol.

The film and the stretched film of the present invention can be used for various purposes listed below taking advantage of properties such as heat resistance, transparency, and flexibility, in addition to optical applications mentioned above. More specifically, the film and the stretched film of the present invention can be used for the interior and exterior of automobiles, personal computers, mobile devices, and solar batteries; solar battery back sheets; photographic lenses for cameras, VTRs, and projectors; finders, filters, prisms, Fresnel lenses, and the like for use in the field of imaging; lenses such as pick-up lenses for optical discs in CD players, DVD players, MD players, and the like for use in the field of lens; optical discs such as CDs, DVDs, and MDs for use in the field of optical recording; films for liquid crystal displays such as light guide plates, diffuser plates, back sheets, reflection sheets, polarizer protective films, polarizing film transparent resin sheets, phase difference films, light diffusing films, and prism sheets, surface protective films, and the like for use in the field of information devices; optical fibers, optical switches, optical connectors, and the like for use in the field of optical communications; automobile headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationery. The film of the present invention can be used also as a substitute for a molded article made of a transfer foil sheet.

The film and the stretched film of the present invention may be laminated on a metal or plastic. Examples of a method for laminating the film or the stretched film include lamination molding; wet lamination in which an adhesive is applied onto a metal plate such as a steel plate and then the film or the stretched film is laminated on and bonded to the metal plate by drying; dry lamination; extrusion lamination; and hot-melt lamination.

Examples of a method for laminating the film or the stretched film on a plastic part include insertion molding or laminate injection press molding of injecting a resin into a mold in which a film is provided, and in-mold molding of injecting a resin into a mold in which a pre-molded film is provided.

A laminate of the film or the stretched film of the present invention can be used as, for example, substitutes for paint such as automobile interior materials and automobile exterior materials; building materials such as window frames, bathroom fitments, wallpapers, and floor materials; daily goods; housings for furniture or electrical equipment; housings for OA equipment such as facsimiles, laptop computers, and copy machines; front panels of liquid crystal display screens of terminal equipment such as mobile phones, smartphones, and tablets; and parts of electric or electronic devices.

The resin composition of the present invention can also be suitably used for other applications in addition to the formation of films. For example, when the resin composition is used for injection molding applications, a resulting molded body has good optical characteristics such as transparency and also has a good surface appearance because dispersibility of the multilayer structure polymer (B) in the resin (A) is good. In particular, the resin composition of the present invention can be an excellent molding material because the resin is not separated in a molded body during molding under high shear conditions such as a high injection speed. Such molding materials can be used for those including, for example, lenses such as lenses for common cameras, lenses for video cameras, object lenses, diffraction gratings, holograms, and collimator lenses for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for liquid crystals, films for liquid crystals, substrates for LCDs, and adhesives for bonding liquid crystal elements, screens for projectors, optical filters, optical fibers, optical waveguides, prisms, lenses for lighting, automobile headlights, medical supplies requiring sterilization, microwave cooking vessels, housings for home appliances, toys, and recreation items.

EXAMPLES

Hereinbelow, the present invention will be described more specifically with reference to examples, but is not limited to these examples. In the following description, "part(s)" and "%" represent "part(s) by weight" and "wt %," respectively unless otherwise specified.

(Volume Average Particle Diameter of Multilayer Structure Polymer to (Meth)Acrylic Crosslinked Polymer Layer)

The volume average particle diameter of the multilayer structure polymer to the (meth)acrylic crosslinked polymer layer (volume average particle diameter of acrylic rubber particles) was measured using an acrylic rubber particle latex. The volume average particle diameter (μm) was measured using, as a measuring instrument, MICROTRAC UPA150 manufactured by NIKKISO CO., LTD.

(Polymerization Conversion)

First, part of the obtained slurry was sampled and accurately weighed, dried in a hot-air drier at 120° C. for 1 hour, and then accurately weighed to determine the dry weight as a solid matter content. Then, the ratio between the results of accurate measurement before and after drying was determined as the solid component ratio of the slurry. Finally, the polymerization conversion was calculated by the following formula using the solid component ratio. It is to be noted that in this mathematical formula 1, a chain transfer agent was regarded as a monomer charged.

Polymerization conversion (%)=[(Total weight of raw materials charged×solid component ratio−total weight of raw materials other than water and monomers)/weight of monomers charged]×100

(Graft Ratio)

In 50 mL of methyl ethyl ketone, 2 g of the multilayer structure polymer (B) obtained was dissolved, and the solution was separated into an insoluble matter and a soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate the graft ratio by the following formula.

Graft ratio (%)={(Weight of methyl ethyl ketone insoluble matter−Weight of crosslinked polymer layer)/Weight of crosslinked polymer layer}×100

It is to be noted that the weight of a crosslinked polymer layer refers to the weight of monofunctional monomers charged that constitute the crosslinked polymer layer.

(Imidization Ratio)

An imidization ratio was calculated in the following manner using IR. Pellets of a product were dissolved in methylene chloride to give a solution, and the IR spectrum of the solution was measured at room temperature using TravelIR manufactured by SensIR Technologies. From the obtained IR spectrum, the absorption intensity of ester carbonyl groups at 1720 cm$^{-1}$ (Absester) and the absorption intensity of imide carbonyl groups at 1660 cm$^{-1}$ (Absimide) were determined, and the ratio between them was determined as an imidization ratio (Im % (IR)). The term "imidization ratio" as used herein refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the content of each monomer unit (mol %), such as a glutarimide unit or an ester unit contained in the resin, and the monomer unit content (mol %) was converted to a monomer unit content (wt %) using the molecular weight of each monomer unit.

(Acid Value)

In a mixed solvent of 37.5 mL of methylene chloride and 37.5 mL of methanol, 0.3 g of the obtained glutarimide acrylic resin was dissolved. Two drops of a phenolphthalein ethanol solution were added thereto, and then 5 mL of a 0.1 N aqueous sodium hydroxide solution was added thereto. Then, the excess base was titrated with 0.1 N hydrochloric acid, and the acid value was calculated by a difference expressed in milliequivalent between the amount of the base added and the amount of hydrochloric acid used until neutralization.

(Refractive Index)

The refractive index of a glutarimide acrylic resin was measured as follows. Each composition was processed into a sheet, and the refractive index (nD) of the sheet was measured at the sodium D-line wavelength in accordance with JIS K7142 using an Abbe refractometer 2T manufactured by ATAGO CO., LTD.

(Glass Transition Temperature)

The temperature of a sample was once increased to 200° C. at a rate of 25° C./min by a differential scanning calorimeter (DSC) SSC-5200 manufactured by Seiko Instruments Inc., held at 200° C. for 10 minutes, and decreased to 50° C. at a rate of 25° C./min for preliminary adjustment. Then, the DSC curve of the sample was measured while the temperature of the sample was increased to 200° C. at a temperature rise rate of 10° C./min. The value of integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The thickness of a film was measured using a digimatic indicator manufactured by Mitutoyo Corporation.

(Formation of Uniaxially Stretched Film and Measurement of Orientation Birefringence)

A 25 mm×90 mm test specimen was cut out from an unstretched original film having a thickness of 125 μm obtained in each of the examples and comparative examples (so that the long sides were in the MD direction), both the short sides of the test specimen were held while the test specimen was maintained at a temperature higher by 30° C. than its glass transition temperature for 2 minutes, and the test specimen was uniaxially stretched twice (also referred to as "stretched 100%") at a rate of 200 mm/min in the longitudinal direction (at this time, both the long sides of the test specimen were not fixed). Thereafter, the thus obtained film was cooled to 23° C. and a sample was taken from the central portion of the film for the measurement of birefringence (orientation birefringence) with the use of an automatic birefringence meter (KOBRA-WR manufactured by Oji Scientific Instruments) at a temperature of 23±2° C., a humidity of 50±5%, a wavelength of 590 nm, and an incidence angle of 00. At the same time, in-plane phase difference Re and thickness direction phase difference Rth (incidence angle: 40°) were also measured (measurement of in-plane phase difference Re and thickness direction phase difference Rth will be described in detail later).

It is to be noted that measurement of the orientation birefringence of the multilayer structure polymer (B) alone and the hard polymer layer (C) alone was performed in the following manner: the multilayer structure polymer (B) alone or the hard polymer layer (C) alone was pressed at 190° C. to form a press-molded sheet having a thickness of 500 μm, a 25 mm×90 mm test specimen was cut out from the central portion of the obtained press-molded sheet, and after stretching, the orientation birefringence of the specimen was measured in the same manner as described above.

In addition, the orientation birefringence of the resin (A) was measured in the same manner as described above using a film having a thickness of 125 μm obtained by melt extrusion of the pellets of glutarimide acrylic resin obtained in a production example in the same manner as in Example 1.

(Orientation Birefringence of Original Film)

A 40 mm×40 mm test specimen was cut out from an unstretched original film (thickness: 125 μm) obtained in each of examples and comparative examples, and the orientation birefringence of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness direction phase difference Rth (incidence angle: 400) of the test specimen were also measured (measurement of in-plane phase difference Re and thickness direction phase difference Rth will be described in detail later).

(In-Plane Phase Difference Re and Thickness Direction Phase Difference Rth)

A 40 mm×40 mm test specimen was cut out from an unstretched film having a thickness of 125 μm (original film) obtained in each of examples and comparative examples, and the in-plane phase difference Re of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic birefringence meter at a wavelength of 590 nm, three-dimensional refractive indexes nx, ny, and nz were determined to calculate the thickness direction phase difference, $Rth=((nx+ny)/2-nz) \times d$. It is to be noted that the measured value was multiplied by 100 (μm)/film thickness (μm) to be converted to a value with respect to 100 μm thickness, and the thus obtained value is shown in Table 5.

(Photoelastic Constant)

A strip-shaped test specimen of 15 mm×90 mm was cut out (so that the long side was in the TD direction) from an unstretched film having a thickness of 125 μm (original film) obtained in each of examples and comparative examples. The photoelastic constant of the test specimen was measured using an automatic birefringence meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the photoelastic constant of the multilayer structure polymer (B) alone and the hard polymer layer (C) alone was measured in the following manner: the multilayer structure polymer (B) alone or the hard polymer layer (C) alone was pressed at 190° C. to prepare a press-molded sheet having a thickness of 500 μm, a 15 mm×90 mm test specimen was cut out from the central portion of the obtained press-molded sheet, and the photoelastic constant of the test specimen was measured in the same manner as described above.

In the case of the resin (A), a film having a thickness of 125 μm was produced in the same manner as in Example 1 using pellets of a resin (A1) obtained in Production Example 1, and the photoelastic constant of the film was measured in the same manner as described above.

(Transparency of Stretched Film)

One of objects of the present invention is to provide a film excellent in transparency even if it is stretched. Here, an evaluation index of transparency of the stretched film is defined by measuring the total light transmittance and haze of a biaxially stretched film described below. According to the present invention, the haze obtained by this evaluation will be 2.0% or less.

(Formation of Biaxially Stretched Film and Measurement of Various Physical Properties)

A 13 cm×13 cm test specimen was cut out from an unstretched original film having a thickness of 125 μm, all the four sides of the test specimen were held while the test specimen was maintained at a temperature higher by 20° C. than its glass transition temperature for 10 minutes, and the test specimen was biaxially stretched twice (also referred to as "stretched 100%/") at a rate of 120 mm/min in the biaxial direction at the same time. Thereafter, the resulting film was cooled to 23° C. and a sample was taken from the central portion of the film for the measurement of birefringence (orientation birefringence) with the use of an automatic birefringence meter (KOBRA-WR manufactured by Oji Scientific Instruments) at a temperature of 23±2° C., a humidity of 50±5%, a wavelength of 590 nm, and an incidence angle of 0°. At the same time, in-plane phase difference Re and thickness direction phase difference Rth (incidence angle: 400) were also measured (measurement of in-plane phase difference Re and thickness direction phase difference Rth is described above in detail). The total light transmittance and haze were also measured by the method described above.

(Evaluation of Foreign Substances)

Each sample having an area of 1 m$^2$ was cut out from the films having a thickness of 125 μm obtained in each of examples and comparative examples, and the total number of foreign substances having a size of 20 μm or more was counted by, for example, observation with a microscope.
◯: less than 100 foreign substances per m$^2$
x: 100 or more foreign substances per m$^2$
(Evaluation of Mechanical Strength)

Mechanical strength was evaluated in terms of trimming property and tensile elongation at break as an indicator of crack resistance (tensile elongation: %).
Evaluation of Trimming Property A film having a thickness of 125 μm obtained in each of examples and comparative examples was cut using a cutter, and the cut surface of the film was observed to evaluate the trimming property of the film according to the following criteria.
◯: no cracks were observed in the cut surface
Δ: cracks were observed in the cut surface
x: cracks are significantly observed in the cut surface.
Tensile Elongation at Break A film having a thickness of 125 μm obtained in each of examples and comparative examples and the biaxially stretched film prepared by the method described above were used. A tensile test was performed in accordance with ISO527-3 (JIS K 7127) using a type 5 test specimen at a test rate in MD of 200 mm/min, a temperature of 23±2° C., and a humidity of 50±5%.

(Heat Stability)

The melt viscosity of an obtained resin composition was measured under conditions specified in JIS K7199 (die temperature: 260° C., shear rate: 24 sec$^{-1}$, capillary die diameter: 1 mm, dwell time: 1 hour), and the rate of reduction in melt viscosity was calculated by the following calculation formula from the melt viscosity at a dwell time of 10 minutes and the melt viscosity at a dwell time of 1 hour, and was regarded as an indicator of heat stability. After the test, a strand was observed to determine the presence or absence of foaming due to thermal decomposition of the resin.

Rate of reduction in melt viscosity=(Melt viscosity at a dwell time of 10 minutes−Melt viscosity at a dwell time of 1 hour)/(Melt viscosity at a dwell time of 10 minutes)×100(%)

The heat stability and melt viscosity of the resin composition were evaluated according to the following criteria.
Heat Stability:
◯: The rate of reduction in melt viscosity was less than 20% and no foaming was observed in the strand
x: The rate of reduction in melt viscosity was 20% or more and foaming was observed in the strand Melt Viscosity:
◯: The melt viscosity was low and therefore the resin composition was capable of being extruded without difficulty
x: The melt viscosity was high and therefore the filter was damaged to result in failure to achieve desired filtration accuracy Production Example 1

Production of Glutarimide Acrylic Resin (A1)

A glutarimide acrylic resin (A 1) was produced using poly(methyl methacrylate) as a raw material resin and monomethylamine as an imidization agent.

In this production, a tandem-type reactive extruder was used, in which two extrusion reactors were connected in series. The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a constant weight feeder (manufactured by KUBOTA Corporation). The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder. The resin (strand) discharged from the second extruder was cooled on a cooling conveyer and cut into pellets by a pelletizer. In order to adjust the pressure in the part connecting the resin discharge port of the first extruder to the raw material supply port of the second extruder or to detect variation in extrusion, resin pressure meters were provided at the discharge port of the first extruder, the center of the part connecting the first and second extruders, and the discharge port of the second extruder.

In the first extruder, an imide resin intermediate 1 was produced using a poly(methyl methacrylate) resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts with respect to 100 parts of the raw material resin. The constant flow pressure valve was provided immediately in front of the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterifying agent to produce an imide resin intermediate 2. At this time, the temperature of each barrel of the extruder was 260° C., the screw rotation speed of the extruder was 55 rpm, and the amount of dimethyl carbonate added was 3.2 parts with respect to 100 parts of the raw material resin. Further, the esterifying agent was removed through a vent, and then a glutarimide acrylic resin (A1) was obtained by extrusion through a strand die, cooling in a water tank, and pelletization with a pelletizer.

The obtained glutarimide acrylic resin (A1) is an acrylic resin (A) obtained by copolymerization of a glutarimide unit represented by the general formula (1) and a (meth)acrylate unit represented by the general formula (2).

The imidization ratio, glutarimide unit content, acid value, glass transition temperature, and refractive index of the glutarimide acrylic resin (A1) were measured by the above-mentioned methods. As a result, the imidization ratio was 13%, the glutarimide unit content was 7 wt %, the acid value was 0.4 mmol/g, the glass transition temperature was 130° C., and the refractive index was 1.50.

Production Example 2

Production of Multilayer Structure Polymer (B1)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was substantially no oxygen in the polymerization apparatus. Then, the temperature in the polymerization apparatus was adjusted to 40° C. and 45.266 parts of a raw material mixture of acrylic rubber particles (B-1) shown in Table 2 was continuously added over a period of 135 minutes. After 12 minutes, 24 minutes, and 36 minutes from the start of the addition of (B-1), 0.2 part each of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y)) was added to the polymerization apparatus. After the addition, polymerization was further continued for 0.5 hour to give acrylic rubber particles (polymer of (B-1)). The polymerization conversion was 99.4%.

Thereafter, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (B-2) shown in Table 2 was continuously added over a period of 165 minutes and polymerization was further continued for 1 hour to give a graft copolymer latex. The polymerization conversion was 100.0%. The obtained latex was salted out and coagulated with magnesium sulfate, washed with water, and dried to give a white powder of a multilayer structure polymer (B1).

The average particle diameter of rubber particles (polymer of B-1) of the multilayer structure polymer (B1) was 133 nm. The graft ratio of the multilayer structure polymer (B1) was 77%.

Production Example 3

Production of Multilayer Structure Polymer (B2)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.023 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was substantially no oxygen in the polymerization apparatus. Then, the temperature in the polymerization apparatus was adjusted to 40° C. and 35.208 parts of a raw material mixture of acrylic rubber particles (B-1) shown in Table 2 was continuously added over a period of 105 minutes. After 12 minutes, 37 minutes, 62 minutes, and 87 minutes from the start of the addition of (B-1), 0.2 part, 0.2 part, 0.2 part, and 0.127 part of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y)) were respectively added to the polymerization apparatus. After completion of the addition, polymerization was further continued for 0.5 hour to give acrylic rubber particles (polymer of (B-1)). The polymerization conversion was 97.5%.

Then, the temperature in the polymerization apparatus was adjusted to 60° C., and 0.2 part of sodium formaldehyde sulfoxylate was fed into the polymerization apparatus. Thereafter, 32.148 parts of a raw material mixture of a hard polymer layer (B-2) shown in Table 2 was continuously added over a period of 96 minutes and polymerization was further continued for 0.5 hour. The polymerization conversion then was 98.1%.

Thereafter, 33.156 parts of a raw material mixture of a hard polymer layer (B-3) shown in Table 2 was continuously added over a period of 99 minutes and polymerization was further continued for 1 hour to give a multilayer structure polymer latex. The polymerization conversion was 99.7%. The obtained latex was salted out and coagulated with magnesium sulfate, washed with water, and dried to give a white powder of the multilayer structure polymer (B2).

The average particle diameter of rubber particles (polymer of B-1) of the multilayer structure polymer (B2) was 121 nm. The graft ratio of the multilayer structure polymer (B2) was 112%.

Production Example 4

Production of Multilayer Structure Polymer (B3)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.023 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was substantially no oxygen in the polymerization apparatus. Then, the temperature in the polymerization apparatus was adjusted to 40° C. and 35.208 parts of a raw material mixture of acrylic rubber particles (B-1) shown in Table 2 was continuously added over a period of 105 minutes. After 12 minutes, 37 minutes, 62 minutes, and 87 minutes from the start of the addition of (B-1), 0.21 part, 0.21 part, 0.21 part, and 0.137 part of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y) were respectively added to the polymerization apparatus. After completion of the addition, polymerization was further continued for 0.5 hour to give acrylic rubber particles (polymer of (B-1)). The polymerization conversion was 98.5%.

Then, the temperature in the polymerization apparatus was adjusted to 60° C., and 0.11 part of sodium polyoxyethylene lauryl ether phosphate and 0.2 part of sodium formaldehyde sulfoxylate were fed into the polymerization apparatus. Thereafter, 32.148 parts of a raw material mixture of a hard polymer layer (B-2) shown in Table 2 was continuously added over a period of 96 minutes and polymerization was further continued for 0.5 hour. The polymerization conversion then was 95.8%.

Thereafter, 33.156 parts of a raw material mixture of a hard polymer layer (B-3) shown in Table 2 was continuously added over a period of 99 minutes and polymerization was further continued for 1 hour to give a multilayer structure polymer latex. The polymerization conversion was 98.1%. The obtained latex was salted out and coagulated with magnesium sulfate, washed with water, and dried to give a white powder of the multilayer structure polymer (B3).

The average particle diameter of rubber particles (polymer of B-1) of the multilayer structure polymer (B3) was 133 nm. The graft ratio of the multilayer structure polymer (B3) was 99%.

Production Example 5

Production of Multilayer Structure Polymer (B4)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.023 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was substantially no oxygen in the polymerization apparatus. Then, the temperature in the polymerization apparatus was adjusted to 40° C. and 35.208 parts of a raw material mixture of acrylic rubber particles (B-1) shown in Table 2 was continuously added over a period of 105 minutes. After 12 minutes, 37 minutes, 62 minutes, and 87 minutes from the start of the addition of (B-1), 0.21 part, 0.21 part, 0.21 part, and 0.137 part of sodium polyoxyethylene lauryl ether phosphate (sodium salt of polyoxyethylene lauryl ether phosphate (manufactured by TOHO Chemical Industry Co., Ltd. under the trade name of PHOSPHANOL RD-510Y)) were respectively added to the polymerization apparatus. After completion of the addition, polymerization was further continued for 0.5 hour to give acrylic rubber particles (polymer of (B-1)). The polymerization conversion was 99.2%.

Then, the temperature in the polymerization apparatus was adjusted to 60° C., and 0.11 part of sodium polyoxyethylene lauryl ether phosphate and 0.2 part of sodium formaldehyde sulfoxylate were fed into the polymerization apparatus. Thereafter, 32.148 parts of a raw material mixture of a hard polymer layer (B-2) shown in Table 2 was continuously added over a period of 96 minutes and polymerization was further continued for 1 hour. The polymerization conversion then was 97.0%.

Thereafter, 33.156 parts of a raw material mixture of a hard polymer layer (B-3) shown in Table 2 was continuously added over a period of 99 minutes and polymerization was further continued for 1 hour to give a multilayer structure polymer latex. The polymerization conversion was 97.9%. The obtained latex was salted out and coagulated with magnesium sulfate, washed with water, and dried to give a white powder of the multilayer structure polymer (B4).

The average particle diameter of rubber particles (polymer of B-1) of the multilayer structure polymer (B4) was 127 nm. The graft ratio of the multilayer structure polymer (B4) was 117%.

TABLE 2

| Polymer (B) | | B1 | B2 | B3 | B4 |
|---|---|---|---|---|---|
| Acrylic crosslinked polymer layer | Monofunctional monomer content in (B) (part) | 45 | 35 | 35 | 35 |
| (Acrylic rubber particles) | Butyl acrylate (%) | 90 | 90 | 90 | 90 |
| (B-1) | Methyl methacrylate (%) | 10 | 10 | 10 | 10 |
| | Allyl methacrylate (part) | 0.225 | 0.175 | 0.175 | 0.175 |
| | Cumene hydroperoxide (part) | 0.041 | 0.033 | 0.033 | 0.033 |
| Volume average particle diameter of (B-1) (nm) | | 133 | 121 | 133 | 127 |
| Hard polymer layer (C) | Monofunctional monomer content in (B) (part) | 55 | 32 | 32 | 32 |
| (B-2) | Methyl methacrylate (%) | 57.8 | 52.25 | 52.25 | |
| | Butyl acrylate (%) | 4 | 4 | 4 | 4 |
| | Benzyl methacrylate (%) | 38.2 | 43.75 | | |
| | Dicyclopentanyl methacrylate (%) | | | | 96 |
| | Phenoxyethyl methacrylate (%) | | | 43.75 | |
| | Cumene hydroperoxide (part) | 0.254 | 0.148 | 0.148 | 0.148 |
| Hard polymer layer (D) | Monofunctional monomer content in (B) (part) | | 33 | 33 | 33 |
| (B-3) | Methyl methacrylate (%) | | 96 | 96 | 96 |
| | Butyl acrylate (%) | | 4 | 4 | 4 |
| | Benzyl methacrylate (%) | | 0 | 0 | 0 |
| | Cumene hydroperoxide (part) | | 0.156 | 0.156 | 0.156 |
| Sign of birefringence of multilayer structure | Orientation birefringence | + | (−) | (−) | − |
| polymer (B) alone | Photoelastic birefringence (constant) | + | + | + | + |

* The accuracy of determining the sign of the orientation birefringence of B2 is low because such orientation birefringence is very small.

TABLE 3

|  | A1 |  |
|---|---|---|
| Sign of birefringence of resin (A) | Orientation birefringence | (+) |
|  | Photoelastic birefringence (constant) | – |

* The accuracy of determining the sign of the orientation birefringence of A1 is low because such orientation birefringence is very small.

TABLE 4

|  |  | B2 | B3 | B4 |
|---|---|---|---|---|
| Sign of birefringence of hard polymer layer (C) | Orientation birefringence | + | + | + |
|  | Photoelastic birefringence (constant) | + | + | + |

Examples 1 to 3 and Comparative Examples 1 and 2

A mixture of the acrylic resin (A) and the multilayer structure polymer (B) shown in Table 2 was supplied at a rate of 10 kg/hr to a single screw extruder having a full-flight screw with a diameter of 40 mm. The set temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to give pellets.

The obtained pellets were supplied at a rate of 10 kg/hr to a single screw extruder equipped with a leaf disk filter with a pore size of 5 µm and connected to a T-die at the outlet thereof and melt-extruded to give a film having a thickness shown in Table 5. The set temperature of temperature control zone of the extruder was 260° C. and the screw rotation speed of the extruder was 20 rpm, and the pellets were supplied at a rate of 10 kg/hr. Various physical properties of the film were evaluated.

TABLE 5

|  |  |  |  | Example | | | Comparative Example | |
|---|---|---|---|---|---|---|---|---|
|  |  |  |  | 1 | 2 | 3 | 1 | 2 |
|  | Acrylic resin (A) |  | Kind | A1 | A1 | A1 | A1 | A1 |
|  |  |  | (Part) | 39.6 | 39.6 | 39.6 | 53 | 100 |
|  | Multilayer structure polymer (B) |  | Kind | B2 | B3 | B4 | B1 | — |
|  |  |  | (Part) | 60.4 | 60.4 | 60.4 | 47 | — |
| Physical properties of film | Film thickness |  | (µm) | 125 | 125 | 125 | 125 | 125 |
|  | Glass transition temperature |  | (° C.) | 121 | 124 | 121 | 121 | 125 |
|  | Total light transmittance |  | (%) | 92.3 | 92.0 | 92.2 | 92.1 | 92.4 |
|  | Haze value |  | (%) | 0.61 | 0.4 | 1.0 | 0.62 | 0.25 |
|  | Crack resistance | Evaluation of trimming property |  | ○ | ○ | ○ | ○ | X |
|  |  | Tensile elongation at break | (%) | 114 | 115 | 91 | 114 | 5 |
|  | Foreign substances |  |  | ○ | ○ | ○ | ○ | ○ |
|  | Heat stability |  |  | ○ | ○ | ○ | ○ | ○ |
|  | Melt viscosity |  |  | ○ | ○ | ○ | ○ | ○ |
|  | Unstretched | Photoelastic constant ($\times 10^{-12}$) | ($Pa^{-1}$) | 0.09 | -0.10 | -3.93 | -0.09 | -4.38 |
|  |  | Orientation birefringence ($\times 10^{-4}$) |  | -0.11 | -0.09 | -0.11 | ±0.07 | ±0.04 |
|  |  | Re (with respect to 100 µm) | nm | -1.1 | -0.9 | -1.1 | ±0.7 | ±0.4 |
|  |  | Rth (with respect to 100 µm) | nm | -2.3 | -2.5 | -3.2 | -1.6 | -0.9 |
|  | Stretched twice (Uniaxial stretching) | Orientation birefringence ($\times 10^{-4}$) |  | 0.03 | 0.09 | -1.6 | 0.33 | 0.05 |
|  |  | Re (with respect to 100 µm) | nm | 0.3 | 0.90 | -16.7 | 3.3 | 0.5 |
|  |  | Rth (with respect to 100 µm) | nm | 0.2 | 1.0 | -8.2 | 1.1 | 0.6 |
|  | Stretched twice (Biaxial stretching) | Film thickness | (µm) | 44 | 32 | 26 | 33 | 26 |
|  |  | Orientation birefringence ($\times 10^{-4}$) |  | ±0.06 | ±0.09 | 0.88 | 0.07 | ±0.15 |
|  |  | Re (with respect to 100 µm) | nm | ±0.6 | ±0.9 | 8.8 | 0.7 | ±1.5 |
|  |  | Rth (with respect to 100 µm) | nm | 0.7 | -0.8 | -32.7 | 1.2 | -2.2 |
|  |  | Total light transmittance | (%) | 92.38 | 92.60 | 92.90 | 92.83 | 92.4 |
|  |  | Haze value | (%) | 0.60 | 0.60 | 1.90 | 2.48 | 0.3 |
|  |  | Tensile elongation at break | (%) | 114 | 66 | 75 | 111 | 31 |

* "±" means that distinction of the sign was impossible.

As shown in Table 5, the films obtained in Examples 1 to 3 have high heat resistance and high transparency and are also excellent in crack resistance such as trimming property. Further, the films have low birefringence, and hardly exhibit birefringence even when stretched. In addition, it is understood that the films have a very small photoelastic constant and hardly exhibit birefringence even when stress is applied thereto. That is, the films have very low optical anisotropy. Furthermore, it is understood that the biaxially stretched films have, of course, a small birefringence as well as a small haze, and are excellent in transparency after stretching. Since these orientation birefringence and photoelastic constants based on the photoelastic birefringence of the resin composition of the present invention are sufficiently small, it can be said that the resin composition of the present invention is a material suitable for optical applications. The film of the present invention is suitable for optical films. Since the film of the present invention is excellent in optical isotropy, particularly in transparency, even if the film is stretched, such a film is suitable for an optical film for a liquid crystal display or the like, and the molded article of the resin composition of the present invention can be suitably used as an optical member such as lenses. Moreover, since the optical film of the present invention has an excellent mechanical strength, it is possible to reduce film transport resistance, crack resistance at the time of actual use, and the occurrence of fine cracks in the trimming process at the time of film production. Furthermore, because the film of the present invention has a high heat resistance, it is possible to increase curing temperature and drying speed of the film coating process, and thereby to improve the productivity.

The invention claimed is:

1. A resin composition comprising:
   a resin (A), and
   a multilayer structure polymer (B),
   wherein the multilayer structure polymer (B) has a crosslinked polymer layer and a hard polymer layer,
   the resin (A) is not chemically bonded with the crosslinked polymer layer,
   the resin composition has a sea-island structure comprising a dispersion of particles of the multilayer structure polymer (B) in the resin (A),
   the hard polymer layer has at least two different hard polymer layers including a hard polymer layer (C) opposite in sign of a photoelastic constant to that of the resin (A) and a hard polymer layer (D),
   no polyfunctional monomer is used for the hard polymer layer (C) and for the hard polymer layer (D), and
   the resin (A) is an acrylic resin containing methyl methacrylate in an amount of 30 to 100 wt %.

2. The resin composition according to claim 1 wherein the hard polymer layer (C) is a hard polymer layer containing as a structural unit a vinyl-based monomer having an alicyclic structure, a heterocyclic structure, or an aromatic group.

3. The resin composition according to claim 1, wherein the hard polymer layer (D) is a (meth)acrylic hard polymer layer.

4. The resin composition according to claim 2, wherein the vinyl-based monomer having an alicyclic structure, a heterocyclic structure, or an aromatic group is a (meth)acrylic monomer.

5. The resin composition according to claim 1, wherein the crosslinked polymer layer is a soft crosslinked polymer layer.

6. The resin composition according to claim 1, wherein the photoelastic constant is $-4\times10^{-12}$ to $4\times10^{-12}$ $Pa^{-1}$.

7. The resin composition according to claim 1, wherein the orientation birefringence is $-1.7\times10^{-4}$ to $1.7\times10^{-4}$.

8. The resin composition according to claim 1, wherein the multilayer structure polymer (B) is a (meth)acrylic rubber-containing graft copolymer obtained by multistage polymerization, in which at least two stages of the multistage polymerization are polymerization of a monomer mixture (c) containing a vinyl-based monomer having an alicyclic structure, a heterocyclic structure, or an aromatic group and a monomer copolymerizable therewith in the presence of (meth)acrylic rubber-containing polymer particles and polymerization of a monomer mixture (d) containing an alkyl (meth)acrylate.

9. The resin composition according to claim 2, wherein the vinyl-based monomer having an alicyclic structure, a heterocyclic structure, or an aromatic group is a monomer represented by the following formula (4):

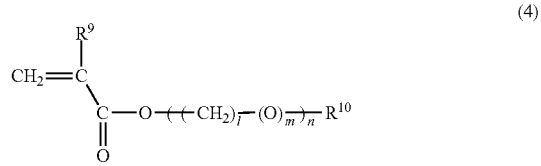

wherein $R^9$ is a hydrogen atom or a substituted or unsubstituted linear or branched alkyl group having 1 to 12 carbon atoms; $R^{10}$ is a substituted or unsubstituted aromatic group having 1 to 24 carbon atoms, or a substituted or unsubstituted alicyclic group having 1 to 24 carbon atoms, and has a monocyclic structure or a heterocyclic structure; l is an integer of 1 to 4; m is an integer of 0 to 1; and n is an integer of 0 to 10.

10. The resin composition according to claim 9, wherein the monomer represented by the formula (4) is at least one member selected from the group consisting of benzyl (meth)acrylate, dicyclopentanyl (meth)acrylate, and phenoxyethyl (meth)acrylate.

11. The resin composition according to claim 8, wherein the monomer mixture (c) contains 1 to 100 wt % of a vinyl-based monomer having an alicyclic structure, a heterocyclic structure, or an aromatic group, and 99 to 0 wt % of a monomer copolymerizable therewith (with respect to 100 parts by weight of the total amount of the vinyl-based monomer having an alicyclic structure, a heterocyclic structure, or an aromatic group and the monomer copolymerizable therewith).

12. The resin composition according to claim 8, wherein the monomer mixture (d) contains 1 to 100 wt % of methyl (meth)acrylate, and 99 to 0 wt % of a monomer copolymerizable therewith (with respect to 100 parts by weight of the total amount of the methyl (meth)acrylate and the monomer copolymerizable therewith).

13. The resin composition according to claim 8, wherein the (meth)acrylic rubber-containing polymer particles have a rubber part formed by polymerization of 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith).

14. The resin composition according to claim 1, wherein the multilayer structure polymer (B) is obtained by:
   (B-1) polymerizing a monomer mixture comprising 50 to 100 wt % of an alkyl acrylate, 50 to 0 wt % of a monomer copolymerizable therewith, and 0.05 to 10 parts by weight of a polyfunctional monomer (with respect to 100 parts by weight of the total amount of the alkyl acrylate and the monomer copolymerizable therewith) to give (meth)acrylic rubber-containing polymer particles,
   (B-2) polymerizing a monomer mixture comprising 1 to 100 wt % of a vinyl-based monomer having an alicyclic structure, a heterocyclic structure, or an aromatic group, 99 to 0 wt % of a monomer copolymerizable therewith, and 0 to 2.0 parts by weight of a polyfunctional monomer (100 parts by weight of the total amount of the vinyl-based monomer having an alicyclic structure, a heterocyclic structure, or an aromatic group and the monomer copolymerizable therewith) in the presence of the (meth)acrylic rubber-containing polymer particles to form a polymer layer (C), and
   (B-3) polymerizing a monomer mixture comprising 1 to 100 wt % of an alkyl (meth)acrylate, 99 to 0 wt % of a monomer copolymerizable therewith, and 0 to 2.0 parts by weight of a polyfunctional monomer (100 parts by weight of the total amount of the alkyl (meth)acrylate and the monomer copolymerizable therewith) in the presence of the polymer obtained in (B-2) to form a polymer layer (D).

15. The resin composition according to claim 8, wherein the volume average particle diameter to the (meth)acrylic rubber part of the (meth)acrylic rubber-containing graft copolymer is 20 to 450 nm.

16. The resin composition according to claim 8, wherein the (meth)acrylic rubber content in the multilayer structure polymer (B) is 1 to 60 parts by weight with respect to 100 parts by weight of the resin composition.

17. The resin composition according to claim 1, further comprising inorganic fine particles having birefringence.

18. The resin composition according to claim 1, further comprising a low molecular compound having birefringence.

19. The resin composition according to claim 1, wherein the resin (A) further contains a cyclic structure.

20. The resin composition according to claim 1, wherein the resin (A) is at least one member selected from the group consisting of a glutarimide acrylic resin (E) having a unit represented by the following general formula (1) and a unit represented by the following general formula (2); a lactone ring-containing acrylic polymer; a partially hydrogenated styrene-based polymer obtained by partially hydrogenating an aromatic ring of a styrene-based polymer obtained by polymerizing a styrene monomer and a monomer copolymerizable therewith; a cyclic acid anhydride repeating unit-containing acrylic polymer; and a hydroxyl group- and/or carboxyl group-containing acrylic polymer:

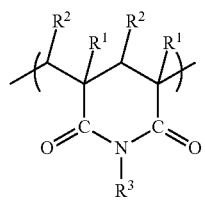

(1)

wherein $R^1$ and $R^2$ are each independently hydrogen or an alkyl group having 1 to 8 carbon atoms, and $R^3$ is hydrogen, an alkyl group having 1 to 18 carbon atoms, a cycloalkyl group having 3 to 12 carbon atoms, or an aromatic ring-containing substituent having 5 to 15 carbon atoms, and

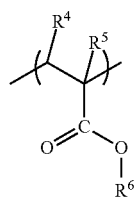

(2)

wherein $R^4$ and $R^5$ are each independently hydrogen or an alkyl group having 1 to 8 carbon atoms, and $R^6$ is an alkyl group having 1 to 18 carbon atoms, a cycloalkyl group having 3 to 12 carbon atoms, or an aromatic ring-containing substituent having 5 to 15 carbon atoms.

21. The resin composition according to claim 20, wherein the glutarimide acrylic resin (E) does not contain a unit represented by the following general formula (3):

(3)

wherein $R^7$ is hydrogen or an alkyl group having 1 to 8 carbon atoms, and $R^8$ is an aryl group having 6 to 10 carbon atoms.

22. The resin composition according to claim 1, wherein the glass transition temperature of the resin (A) is 100° C. or higher.

23. A molded body of the resin composition according to claim 1.

24. A film made of the resin composition according claim 1.

25. The film according to claim 24, which is molded by a melt extrusion method.

26. The film according to claim 24, which has an orientation birefringence of $-1.7 \times 10^{-4}$ to $1.7 \times 10^{-4}$, a photoelastic constant of $-4.0 \times 10^{-12}$ to $4.0 \times 10^{-12}$ $Pa^{-1}$, a tensile elongation at break of 10% or more, and a haze of 2.0% or less.

27. The film according to claim 24, which has a thickness of 10 to 500 μm.

28. A stretched film, which is formed by stretching the film according to claim 24.

29. The stretched film according to claim 28, which has a thickness of 10 to 500 μm.

30. The resin composition according to claim 1, wherein the resin (A) has a photoelastic constant having a negative sign and the hard polymer layer (C) has a photoelastic constant having a positive sign.

* * * * *